United States Patent
Chandrasekharapuram et al.

(10) Patent No.: US 9,507,681 B2
(45) Date of Patent: *Nov. 29, 2016

(54) SCALABLE TESTING IN A PRODUCTION SYSTEM WITH AUTOSCALING

(71) Applicant: Amazon Technologies, Inc., Seattle, WA (US)

(72) Inventors: Ramakrishnan Hariharan Chandrasekharapuram, Seattle, WA (US); Carlos Alejandro Arguelles, Shoreline, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/656,989

(22) Filed: Mar. 13, 2015

(65) Prior Publication Data

US 2015/0186236 A1   Jul. 2, 2015

Related U.S. Application Data

(63) Continuation of application No. 13/466,951, filed on May 8, 2012, now Pat. No. 8,984,341.

(51) Int. Cl.
| | |
|---|---|
| G06F 11/00 | (2006.01) |
| G06F 11/263 | (2006.01) |
| H04L 12/26 | (2006.01) |
| G06F 11/34 | (2006.01) |

(52) U.S. Cl.
CPC ......... *G06F 11/263* (2013.01); *G06F 11/3414* (2013.01); *G06F 11/3433* (2013.01); *H04L 43/50* (2013.01); *G06F 2201/81* (2013.01)

(58) Field of Classification Search
CPC combination set(s) only.
See application file for complete search history.

(56) References Cited

U.S. PATENT DOCUMENTS

| | | | |
|---|---|---|---|
| 6,975,965 | B2 | 12/2005 | Jager et al. |
| 7,389,453 | B2 | 6/2008 | Udell |
| 7,765,081 | B2 | 7/2010 | Blouin et al. |
| 7,793,157 | B2 | 9/2010 | Bailey et al. |
| 7,945,416 | B2 | 5/2011 | Haemel et al. |
| 8,086,720 | B2 | 12/2011 | Breese et al. |
| 8,149,730 | B1 | 4/2012 | Aybay et al. |

(Continued)

OTHER PUBLICATIONS

U.S. Appl. No. 13/864,905, filed Apr. 17, 2013, Carlos Arguelles, et al.

(Continued)

*Primary Examiner* — Amine Riad
(74) *Attorney, Agent, or Firm* — Robert C. Kowert; Meyertons, Hood, Kivlin, Kowert & Goetzel, P.C.

(57) ABSTRACT

A network-based production service is configured to process client requests for the production service via a network, capture production request data defining the requests and store the production request data in a data store. A test system comprising one or more controllers creates test jobs according to a test plan for testing the production service. The test plan creates a test profile for using specified production request data to simulate a load on the production service. Each job created by the test plan specifies a portion of production request data. A job queue receives and queues test jobs from one or more controllers configured to add test jobs to the job queue according to the test plan. Workers access jobs from the job queue and the production request data from the data store as specified in each job and replay the production request data to the production service.

20 Claims, 14 Drawing Sheets

(56) References Cited

U.S. PATENT DOCUMENTS

| | | |
|---|---|---|
| 8,185,619 B1 | 5/2012 | Malocco et al. |
| 8,762,113 B2 | 6/2014 | Santhosh et al. |
| 8,984,341 B1 | 3/2015 | Chandrasekharapuram et al. |
| 9,329,915 B1 * | 5/2016 | Chandrasekharapuram  G06F 11/00 |
| 2002/0017156 A1 | 2/2002 | La Perna et al. |
| 2008/0282112 A1 | 11/2008 | Bailey et al. |
| 2011/0099424 A1 | 4/2011 | Trevino et al. |
| 2012/0266023 A1 | 10/2012 | Brown et al. |
| 2013/0179144 A1 * | 7/2013 | Lu ........................ G06F 11/3414 703/20 |

OTHER PUBLICATIONS

U.S. Appl. No. 13/466,943, filed Mar. 8, 2012, Ramakrishnan Chandrasekharapuram, et al.

U.S. Appl. No. 13/466,955, filed Mar. 8, 2012, Ramakrishnan Chandrasekharapuram, et al.

U.S. Appl. No. 14/032,324, filed Sep. 20, 2013, Carlos Arguelles, et al.

* cited by examiner

SCALABLE TESTING IN A PRODUCTION SYSTEM WITH AUTOSCALING

This application is a continuation of U.S. patent application Ser. No. 13/466,951, filed May 8, 2012, now U.S. Pat. No. 8,984,341, which is hereby incorporated by reference in its entirety.

BACKGROUND

Large scale computing systems such as those found in network-based production services have become widely available in recent years. Examples of these systems are on-line retail, on-line internet service providers, on-line businesses such as photo processing, corporate networks, cloud computing services and/or web-based hosting services. These businesses may have multiple computing devices (e.g., thousands of hosts) in geographically separate locations configured to process millions of client requests daily or even hourly, for example. Ensuring that these services can scale to handle abnormal loads (e.g., client requests) is a non-trivial problem. Instead of testing an actual production system, software testers usually create a scaled-down copy of a production system with a smaller number of hosts and test with a smaller, proportional load. Other approaches include component-level stress tests where a single component of the architecture is targeted with each tests. Additionally, using real-world data on a large scale stress test is also challenging. Existing test solutions are not scalable to handle storing, accessing, processing and/or applying a load to test at the size of today's large production systems. As a further complication, it may be desirable to test for some time periods may having loads that are many times the load of other time periods. For example, a business may want to test how a network site will handle increased traffic during a time period for which the business is advertising a special promotion, or test how a retail website will handle a volume of traffic expected on peak shopping days (e.g., Black Friday or Cyber Monday).

Testing a large scale network with the methods described above often misses problems that would only surface on a higher scale that is only available in the production system. Additionally, the methods described above for testing components individually, for example, may not encounter issues that are found only through the interaction between sub-components in a system. This may lead to outages in the production system that affect business revenue and degrade the customer experience.

Figure 1:
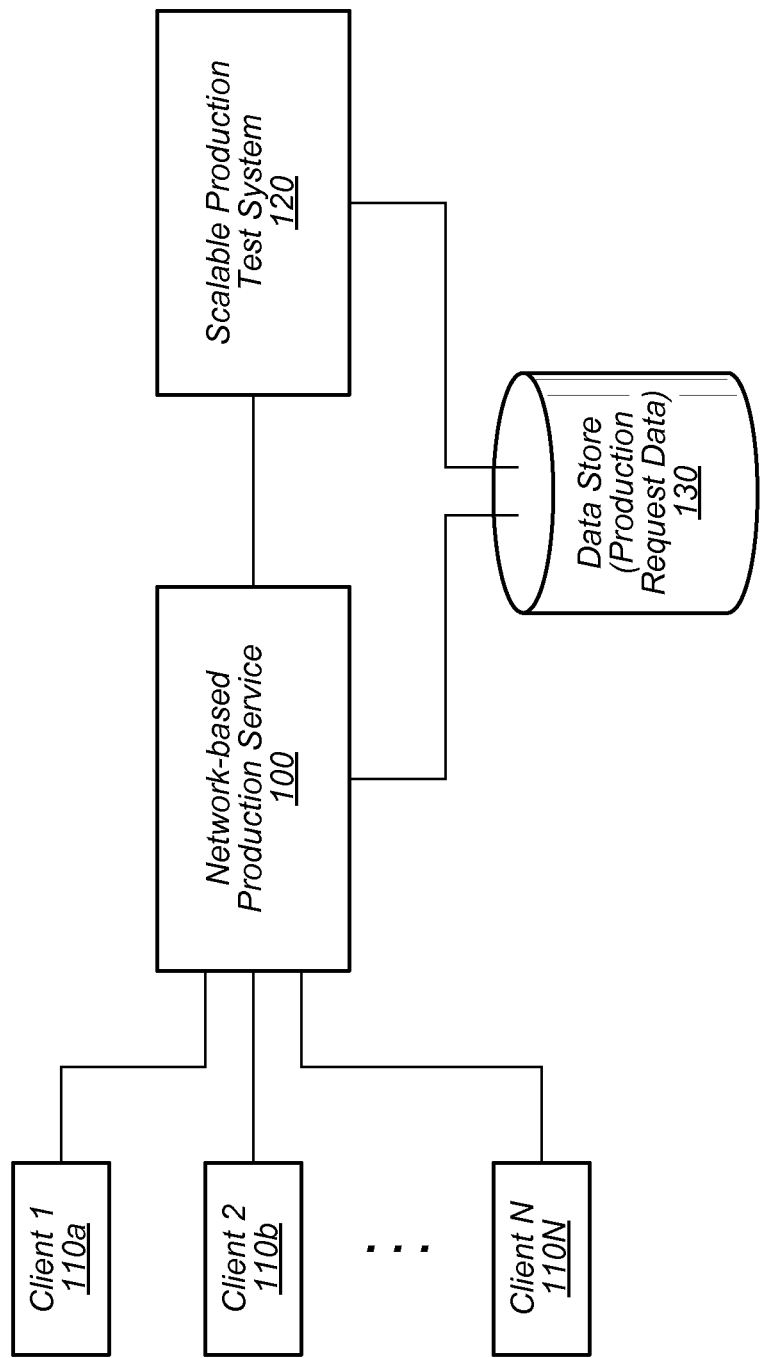
FIG. 1 illustrates a configuration of a system for testing a network-based production service that supports scalable testing, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, systems and methods for scalable testing of a production system are provided. A network-based production service implemented by one or more computers is configured to process request from clients for the production service via a network. Production request data defining the requests are captured and stored in a data store for subsequent use in testing the production service. In some embodiments, a test system is implemented by one or more computers and comprises one or more controllers configured to create test jobs according to a test plan for testing the production service. The test plan specifies production request data and a profile for using the production request data to simulate a load on the production service. In some embodiments, a job queue is configured to receive and queue jobs from one or more controllers. The one or more controllers add test jobs to the job queue according to the test plan, in some embodiments. One or more workers are configured to access jobs from the job queue, access production request data from the data store as specified in each job. The plurality of workers replay the production request data to the production service in some embodiments.

In addition, in some embodiments, an auto-scaler and an auto-shutdown module are implemented. The auto-scaler is configured to scale the number of the one or more workers in response to one or more metrics. For example, the metrics may comprise the number of test jobs in the job queue, the number of untaken test jobs in the job queue, the number of taken test jobs in the job queue, one or more health metrics of the workers, or anticipated test load. The auto-shutdown module is configured to determine whether to shutdown the simulated load on the production service in response to one or more system metrics. For example, the metrics monitored by the auto-shutdown module may be, one or more health metrics of the production service, the number of test jobs in the job queue, the number of untaken test jobs in the jobs queue, and/or the number of taken test jobs in the job queue.

A network-based production service may be an on-line retail business that may process millions of client request per day or even per hour, for example. However, on a given day such as peak shopping days (e.g., Black Friday, Cyber Monday) the number of client requests may be two to fours times larger than an average day. In order to ensure the health of the production system during peak times, a test system may be implemented to test the production service hosting the on-line retail business. To create the test data, the client requests for a given time period may be captured for replay on the production system during test, for example. Client requests may be captured without interfering with the normal processing of the client requests. Examples of client request data are one or more web page requests, selecting an object in the web page, one or more of the steps of the check-out process for the on-line retail business, or requests to a web services based compute or storage service. A test plan may be created to simulate a stressful load such as peak shopping days or an increasing/decreasing load (e.g., client data captured for replay during test). The production request data (e.g. captured client data) may be combined to create the test profile as determined by the test plan. The components utilized to test the production system may be may be auto-scaled to meet the demand of the test plan, for example. Controllers may create test jobs as determined by the test plan and submit the jobs to job queues as would client requests in a production service. Workers access the jobs from the job queue, access the production request data from a data store as specified in the jobs, and replay the production data on the production service, for example. The simulated requests from the test jobs execute on the production service in parallel with ongoing client requests, for example. Workers and controllers may be scaled independently to implement the test plan and/or in response to one or more metrics. In addition, to ensure the health of the system and avoid affecting customers, an auto-shutdown module may be implemented to shut down the test in response to one or more system metrics.

FIG. 1 illustrates a configuration of a system for testing a network-based production service that supports scalable testing, according to one embodiment. In general, a network-based production service 100 may be any type of network-based service, such as on-line retail, web service-based or cloud computing/storage, and/or image/web hosting service, for example. In some embodiments, network-based production service 100 receives requests from clients 110. Examples of requests received from clients 110 are requesting one or more web pages viewable from a web-based browser, uploading one or more images to an online image processing business, and/or accessing a remotely implemented computing environment. Network-based production service 100 may receive thousands or even millions of client requests per day, minute or seconds, for example. The client request data received by network-based production service 100 during a given time period is stored in production request data store 130 for later use during testing of network-based production service 100, in some embodiments. Examples of client request data are web page accesses, selecting a link on a webpage or uploading and/or downloading images/data. Scalable production test system 120 may determine a test plan and create a test profile with the production request data. The production request data in production request data store 130 is accessed by scalable production test system 120 during testing of network-based production service 100. Components, discussed in later figures, are implemented such that scalable production test system 120 replays the production request data (e.g., captured client requests) to network-based production service 100 to create "real-world", real-time, at scale simulations to stress network-based production service 100 safely.

In some embodiments, network-based production service 100 is a network-based service implemented by one or more computers configured to process client requests. An example, of network-based production service 100 may be a remote computing service configured to allow multiple clients to configure dedicated compute environments. Other examples are businesses such as on-line retail, web-hosting services, on-line image processing, brokerage firms, remote data storage, email services and/or social media web-sites. In some embodiments, network-based production service 100 receives a plurality of requests from client 110. For example, requests from clients 110 may be requests to access product pages on an on-line retail site. As another example, requests from clients 110 may be reading and/or submitting information to a social media site. For a given on-line retail sites, the number of requests could be thousands or millions of requests per hour.

In some embodiments, production request data store 130 stores client request data for a given time period. The client request data is received by network-based production service 100 and processed in network-based production service 100. In addition, as a low level background task for example, the client request data is captured on an ongoing basis without interfering with the normal processing of the client requests. The captured client request data is stored in production request data store 130 for subsequent use by scalable production test system 120. The production request data may be stored in time intervals such as minutes, for example. A time stamp and other identifying information are stored with the production request data, in some embodiments. In addition, the production request data may be encrypted prior to storage in production request data store 130, in some embodiments. The client request data may be organized in data store 130 according to time intervals (e.g., minutes) of standard timeframes (e.g., days). In some embodiments, captured production request data maybe maintained in data store 130 for a limited amount of time, such as a two week rolling window, for example. In addition, data from time periods of interest may be kept indefinitely. A time period of interest may be a peak sales day for a retail business or a time period with a significant increase in traffic on a social media or news website. This will be discussed in further detail in the FIGs. below.

In some embodiments, data store 130 includes, but is not limited to, solid state storage, one or more disk drives, multiple disk drives configured as a RAID system, network-based storage devices, databases, and/or a cloud computing resource.

In some embodiments, scalable production test system 120 is configured to test network-based production service 100 with production request data from data store 130. Production request data is captured client request data from actual client request to the production service, in some embodiments. Scalable production test system 120 replays production request data from production request data store 130 to network-based production service 100 to test network-based production service 100. The production request data from a particular time period is replayed to network-based production service 100 in addition to ongoing client requests from client 100, in some embodiments. In other embodiments, the production request data from different time periods is combined to create a more stressful test. For example to simulate a given time period of client requests, production request data from a particular time period or that exhibits a profile of interest may be replayed to production service 100. The production request data may be replayed in network-based production service 100 in order to test network-based production service 100. As an alternate example, scalable production test system 120 may scale the tests to stress network-based production service 100 by merging production request data from similar standard time periods (e.g., from multiple days) captured at a particular time interval into a single test for the standard time period. Merging the production request data may create a stress test for network-based production service 100 to determine network-based production service 100's response to the simulated quantity of requests. This will be discussed in further detail below.

Production request server 100 may be a network-based storage service, for example. On a minute by minutes basis any given number of clients may store or request data from the network-based storage service. To ensure that the network-based storage service can respond to large amounts of client requests, the network-based storage service may be stress tested with client data that has been previously captured. The scalable production test system may store all of the client traffic on a minute by minute basis during a one week window. To stress (e.g. test) the network-based service, the stored client traffic (e.g. production request data) is replayed real-time with current client traffic (e.g., store and request for data). The response of the network-based storage service can be monitored to ensure that the response is as expected. As another example, the captured client request data (e.g., production request data) may be combined to create a more stringent stress test. For example, production request data from three separate days may be combined to create a single test. The combined production request data may simulate a peak period of client requests to the network-based service, for example.

Figure 2:
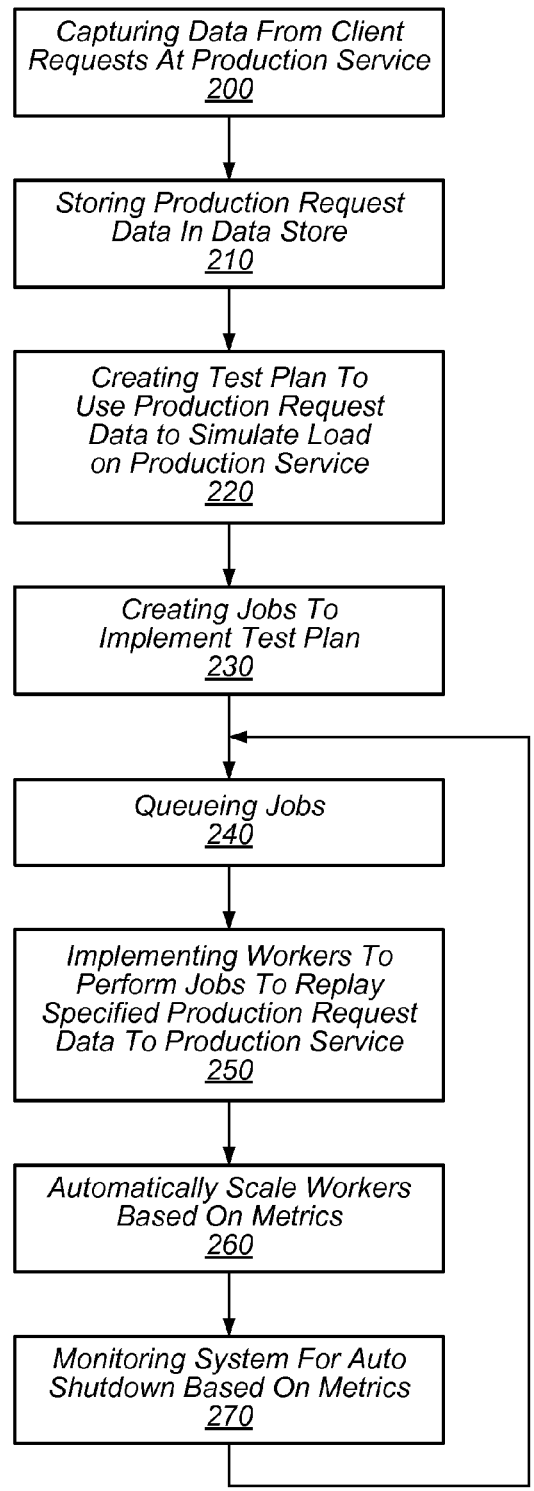
FIG. 2 is a flowchart of a method for implementing scalable testing, according to one embodiment.

FIG. 2 is a flowchart of a method for implementing scalable testing, according to one embodiment. In general, in some embodiments, during normal operation of the production service (e.g., network-based production service 100 in FIG. 1) data from client requests are captured. The captured data is stored and can be replayed in response to a test plan (e.g. as implemented by scalable production test system 120 in FIG. 1). The test plan may be created by one or more controllers in scalable production test system 120 based on the production request data (e.g., captured client data). The production request data may be replayed by jobs submitted to a job queue. Workers may perform the jobs submitted to the jobs queue. In response to metrics of the scalable production test system, the quantity of workers are scaled, in some embodiments. In some embodiments, metrics are monitored to determine if auto-shutdown is required to avoid the test consuming too many resources and/or negatively impacting customer experience on the production service, for example.

As indicated in 200, in some embodiments, the data from client requests at the production service (e.g., network-based production service 100 in FIG. 1) are captured. The client requests are captured on an ongoing basis and stored in standard time intervals (e.g., minutes), in some embodiments. In addition to processing the request in network-based production service 100, the client requests are captured on an ongoing basis as a low level or background task in order to avoid interfering with client services. Capturing the client data for subsequent use according to a test plan, for example, allows for testing the network-based production service with real-world scenarios. As discussed above, a network-based production service may be a service such as on-line retail, web-hosting services, on-line image processing, brokerage firms, remote data storage, email services, cloud computing or storage, and/or social media websites. Thus, data from client requests may be information posted to a social media websites, photos requested from an on-line image processing website or requests for product pages at an on-line retail website, for example. Client requests to the production service may be captured without interfering with normal processing of the client requests by the production service. The captured data is sufficient to subsequently reply the client request to simulate an additional production load on the production service.

As indicated in 210, in some embodiments, the production request data (e.g., from client requests in 200), is stored in a data store (e.g., production request data store 130 in FIG. 1). In some embodiments, the production request data may be stored with metadata describing an aspect of the production service and timing information corresponding to the client request. For example, metadata may include information about the webpage accessed, the geographic location of the request or other unique identifiers that may be filtered during test. In some embodiments, the production request data is encrypted to maintain the security of the client data. Further details will be provided in subsequent figures.

As indicated in 220, in some embodiments, a test plan is created to simulate loads on the production service using production request data. In some embodiments, the test plan specifies the production request data and a test profile for using the production request data to simulate a load on the production service. In some embodiments, the test plan specifies what production request data will be combined to create a given test profile (e.g., constant load, increasing load, etc.). To determine the test profile, a controller may query the production request data (e.g., in data store 130) and based on the query, determines that rate at which the production request data should be applied. Controllers in the scalable production test system may determine and implement the test plan, in some embodiments. In addition, the quantity of controllers may scale in response to the test plan. This will be described in further detail below.

Examples of test profiles specified by the test plan are a straight replay of the production request data for a standard timeframe, a replay of filtered production request data, and/or a combination of several standard timeframes of production request data for a test during a given standard timeframe. A test plan that specifies a replay of filtered production request data, may filter the production request data according to a given location of the production service (e.g., only requests sent to a German version of a website hosted by the production service). A combination of the production request data may be created to simulate a more stressful load for example. The production request data may be re-ordered and/or combined with other production request data with similar standard time intervals from different time periods to simulate peak traffic, for example. Further details of the test plan will be provided in subsequent figures.

As indicated in 230, in some embodiments, jobs are created to implement the test plan. As discussed above in 220, the test plan determines the production request data to replay (e.g., simulate loads) to the production service. In some embodiments, the test jobs each include information corresponding to a file in data store 130 that includes the portion production request data to be replayed for that job and instructions for executing the test job. Instructions may identify transformations of some aspect of the production request data.

As indicated in 240, in some embodiments, jobs are queued. As discussed above, the jobs (e.g., test jobs) are replays of client requests that have been stored and are replayed to simulate loads (e.g., in network-based production service 100 in FIG. 1). The jobs are queued according to the test plan discussed in 220. As discussed above, the test plan determines the test profile for testing network-based production service 100. In some embodiments, controllers in scalable production test system 120 create jobs to submit to the test queue. The number of controllers may scale in response to the quantity of jobs required to implement the test plan. The jobs may include pointers to the production data and instructions associated with the jobs. Workers access the jobs for replay in network-based production service 100. Since workers and controllers independently interact with the jobs in the job queue, each may be scaled independently. For example, workers can be scale in response to the quantity of jobs in the job queue or controllers can be scaled in response to the test plan for creating jobs for the job queue.

As indicated in 250, in some embodiments, workers are implemented to perform jobs (e.g., test jobs) to replay specified production request data to the production service (e.g., network-based production service 100 in FIG. 1). The replay of the production request data simulates loads on the production service. In some embodiments, the workers are automatically scaled based on test system metrics, as indicated in 260. For example, if jobs are not performed at a particular rate or at a rate below a predetermined threshold, then more workers may be added. As another example, if the number of jobs in the queue exceed a threshold, the workers may be scaled to respond to the additional job load. In addition, the queued jobs are performed on the production service in parallel with on-going client requests in some embodiments. As discussed above in FIG. 1, this creates a real world stress test for the production service (e.g., network-based production service 100 in FIG. 1) This will be discussed in detail in subsequent figures.

As indicated in 270, in some embodiments, metrics are monitored for auto-shutdown of the simulated load on network-based production service 100. For example, system metrics such, as the number of test jobs in the job queue, the status of the jobs in the job queue (e.g., taken or untaken), the number of workers, or production service metrics. For example, too many jobs (or uncompleted jobs) in the job queue may indicate a problem with the workers being able to post the jobs to the production service at a sufficient rate. Production service metrics that may be monitored may include CPU usage, memory usage, disk usage or network usage. One or more of these metrics are compared to a predetermined threshold, in some embodiments. If one or more of the metrics exceeds the threshold, auto-shutdown may occur. A monitored metric exceeding a given threshold may indicate that usage is reaching a point where on-going real client requests may be affected, thus auto-shutdown is necessary to avoid affecting clients and/or shutting down the production service, in some embodiments. In some embodiments, auto-shutdown will delete, the job queue, the workers, jobs from the queue, and/or the controllers to stop simulation of the load on the network based production service 100. In addition, portions of the method described in 240, 250, 260, 270 are an ongoing process during execution of the test plan created in 220.

Figure 3:
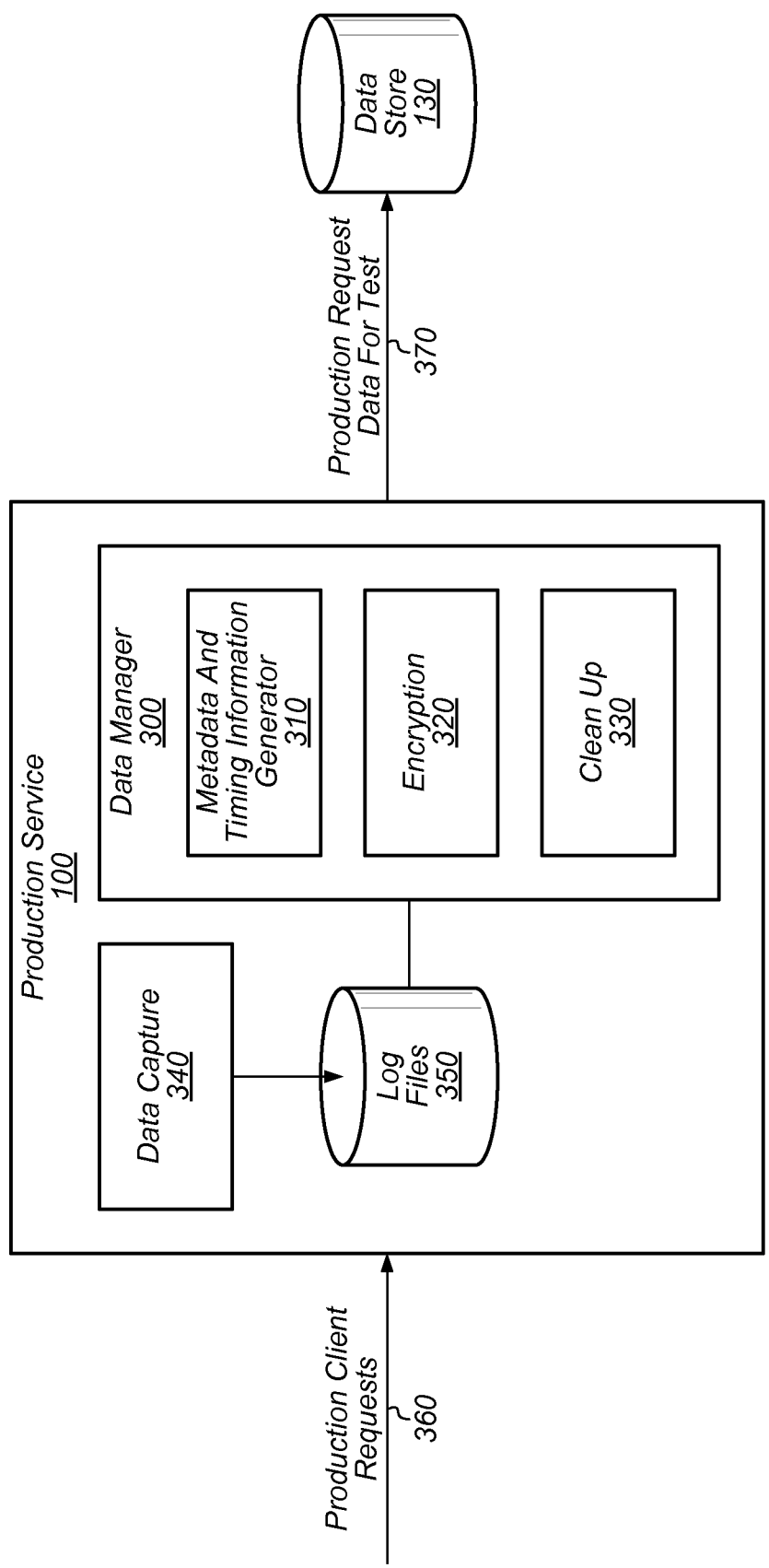
FIG. 3 illustrates a configuration for capturing production request data, according to one embodiment.

FIG. 3 illustrates a configuration for capturing production request data, according to one embodiment. As discussed above, network-based production service 100 may be any type of network-based service, such as on-line retail, remote computing services, and/or image/web hosting service, for example. Network-based production service 100 receives production client requests. Examples of production client requests (e.g., received from client 110 in FIG. 1) are requesting one or more web pages viewable from a web-based browser, uploading one or more images to an online image processing business, and/or accessing a remotely implemented computing environment. Network-based production service 100 may receive thousands or even millions of production client requests per day, for example. To implement scalable testing of the production system, in some embodiments, a system may be provided to capture the production client requests, log the client requests and manage the production request data. The client request data is captured by a data capture module 340 and stored in log files 350. In some embodiments, capturing the client request data is a low priority task so that client traffic within network-based production service 100 is not affected. A data manager 300 tags the captured production client requests 360 with metadata, encrypts the tagged data, and manages the cleanup of data. Data manager 300 includes, in some embodiments, a metadata and timing information generator 310, and encryption module 320, and a clean up module 330. The metadata and timing information generator 310, generates the metadata and timing information associated with the production client requests. In some embodiments, the production request data, the metadata and/or timing information are encrypted by encryption module 320 prior to storage in data store 130. The data manager also includes a cleanup mechanism 330, in some embodiments, to remove old production request data for test from data store 130.

In some embodiments, data capture module 340 captures the production client requests 360 received at network-based production service 100. In some embodiments, data capture module 340 captures the production client data as a low level task without interfering with the production service mechanisms for responding to the same client requests (e.g., requests from clients 110 in FIG. 1). Data capture 340 writes production client requests 360 to log files 350 according to predetermined standard time intervals (e.g., minutes). For example, each production client request 360 received may be captured by data capture module 340 and written to log files 350. In other embodiments, only a portion of client requests may be captured. Capturing and storing actual client requests provides real world data for use during testing of network-based production service 100.

In some embodiments, data manager 300, tags the production data (e.g., captured client requests) from the log files with metadata describing an aspect of the production service to which production client request 360 pertains and timing information (e.g. date and time of the client request), encrypts the tagged log files, and cleans up the stored production data for test. Metadata and timing information generator 310 tags the production data in each log file saved for a given time interval (e.g., each minute) and adds product specific metadata and timing information to the production data in the log file. For example, the timing information may be a date and time for the capture of a production client request 360. The metadata describing aspects of the production service may include the page ID for a webpage or a country location (e.g., the Canadian version of the website), for example. As another example, some production request data may be tagged to identify it as a special test to be kept outside a cleanup process. Clean up module 330 may automatically remove old data from data store 130, in some embodiments. Tags may be used to identify the expiration date for the stored production data, for example. For example, client request data from a peak service day such as Cyber Monday may be kept outside of a cleanup process that maintains a two week rolling window. The data from this peak service day may be used as a specialized stress test of network-based production service 100.

In some embodiments, encryption module 320 encrypts the captured request data from the log files 350 including the production client requests, the metadata and the timing data prior to storing in data store 130. This ensures that the real world data used for scalable testing of network-based production service 100 is not compromised during storage and reuse. In some embodiments, encryption module 320 or another module may compress the data to be stored in data store 130 to minimize storage and data transmission requirements. In other embodiments, the data may be compressed at data store 130 or by another component.

In some embodiments, clean up module 330, removes old production data for test from data store 130. In some embodiments, production request data for test may be stored for a particular time period. In some embodiments, the production request data for test may have an expiration date and it is removed during a daily process to clean up or remove data from data store 130. For example, data may be captured, stored and removed to maintain a two week rolling window of production request data. As discussed above, some specialized data may be tagged so that it is not removed during regular clean up processes.

Although FIG. 3 illustrates data capture module 340, log file 350, and data manager 360 as being provided within the production service, in other embodiments client request data may be captured external to the production service, such as at a gateway router to the production service, without interfering with the flow of client requests to the production service.

Figure 4:
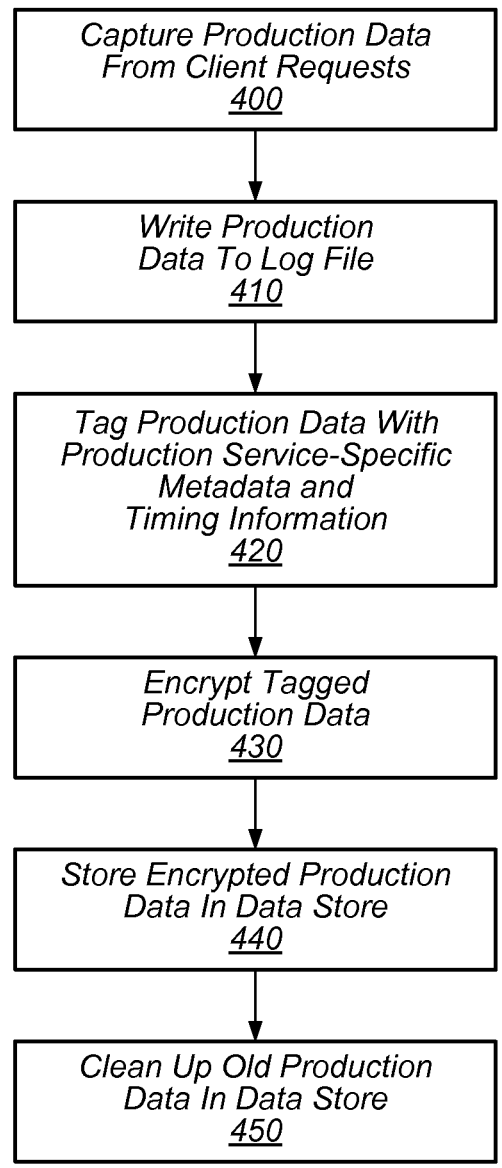
FIG. 4 is a flowchart of a method for managing production request data, according to one embodiment.

FIG. 4 is a flowchart of a method for managing production request data, according to one embodiment. The flow chart depicts a general flow of capturing production request data. For example, the flow chart depicted may be performed by the system illustrated in FIG. 3. In general, when capturing production data from client request (e.g. production client request 360 in FIG. 3), the data is identified, stored and/or managed to facilitate reuse as indicated by a test plan. The captured data (e.g. captured by data capture module 340) is written to log files (e.g. logs files 350 in FIG. 3). The captured data in the log files is tagged in a metadata and timing information generator 310 in some embodiments. The tagged production data is encrypted by an encryption module (e.g. encryption module 320 in FIG. 3) prior to storage in data store 130. In some embodiments, the tagged production data is compressed. In addition, a cleanup module (e.g. cleanup module 330 in FIG. 3) may remove old production data from data store 130.

As indicated in 400, in some embodiments, production data is captured from client requests. The production request data may be captured on an ongoing basis by a data capture module 340 in FIG. 3. The captured data may be stored at predetermined standard time intervals such as one minute intervals in log files 350 in FIG. 3, for example. Examples of production request data are client requests for product pages at an online retail website, posts to a social media website, uploaded and/or downloaded images from an image processing website, and/or applications and data from a shared compute site.

As indicated in 410, in some embodiments, the captured production data is written to log files (e.g., log files 350 in FIG. 3). As indicated in 420, in some embodiments, the logged production request data is tagged with production service specific metadata and timing information. For example metadata and timing information generator 310 in FIG. 3 may perform tagging of the production data in the log files. The timing information indicates the time and date associated with the captured of the production data. The production specific metadata comprises details corresponding to aspects of the production service (e.g. network-based production service 100 in FIG. 1). Examples of metadata are webpage IDs and/or location information. In addition, in some embodiments, the metadata or timing information corresponding to the tagged production request data includes identifiers indicating production data of interest corresponding to a given time period. For example, Cyber Monday for an online retail website or tax filing day on a tax preparation website provide production data representative of peak traffic time periods on the production service.

As indicated in 430, in some embodiments, the tagged production request data is encrypted. For example, and encryption module such as encryption module 320 in FIG. 3 may encrypt the data to protect the client data while it is stored for reuse. In some embodiments, the data is compressed in addition to encryption. As indicated in 440, in some embodiments, the encrypted tagged production request data is stored in a data store (e.g., data store 130 in FIG. 1). The amount of time the encrypted tagged production request data is stored in the data stored is predetermined, in some embodiments. As indicated in 450, in some embodiments, the old production data in the data store is cleaned up. In some embodiments, the tagged production data may have an expiration date to facilitate automatic cleanup, e.g., by cleanup module 330 in FIG. 3. For example, data may be kept on for a two week rolling window. In alternate embodiments, the clean up mechanism may review the tags corresponding to the stored encrypted production data to determine if data should be kept. To keep the production data of interest (e.g., Cyber Monday described in 420), the time may be set to a date far in the future (e.g., after the next Cyber Monday), in some embodiments.

Figure 5:
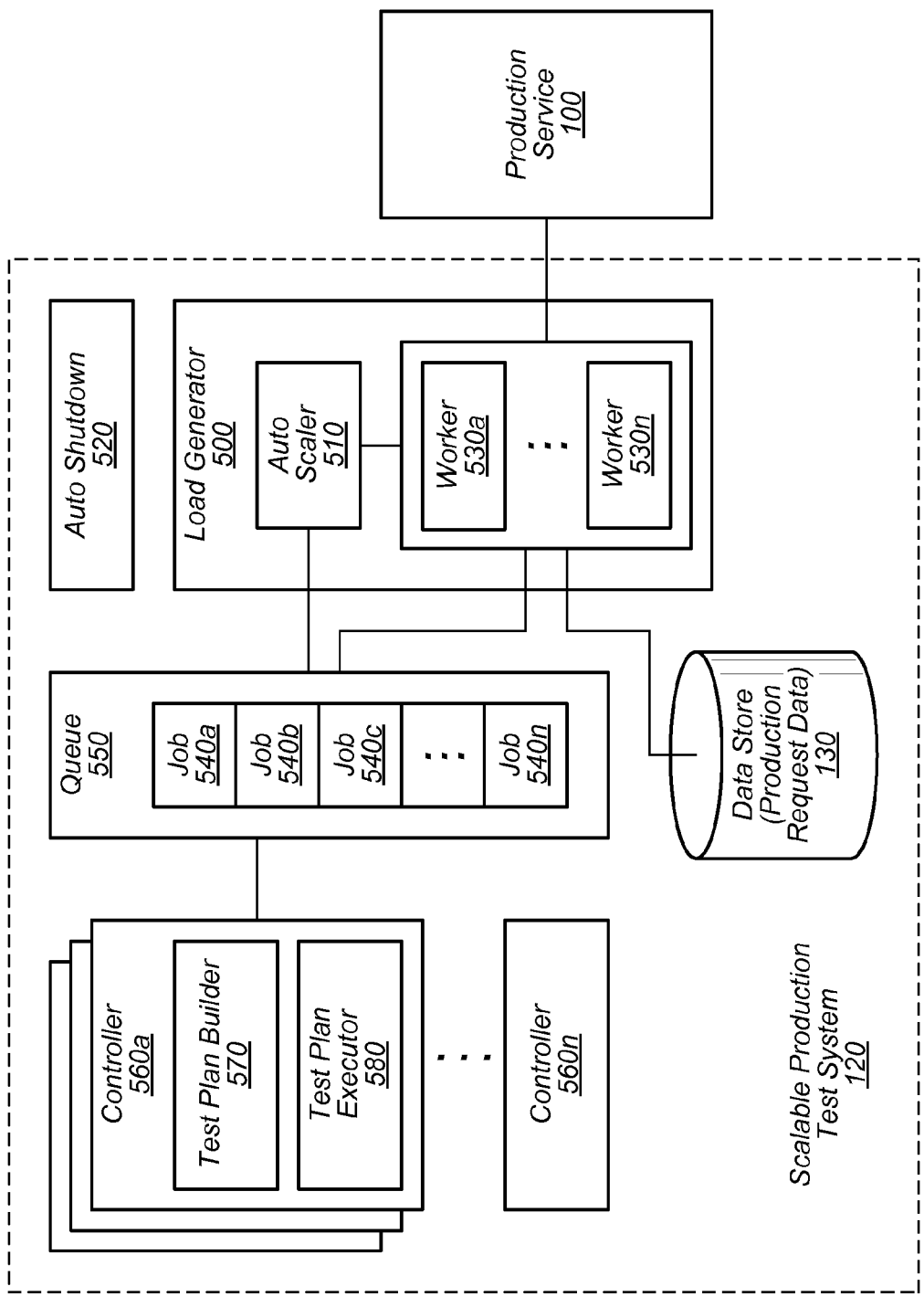
FIG. 5 illustrates a configuration of a scalable production test system, according to one embodiment.

FIG. 5 illustrates a configuration for a scalable production test system, according to one embodiment. In general, a scalable production test system 120 is configured to test and monitor (during the test) network-based production service 100. A scalable production test system (e.g., scalable production test system 120 in FIG. 1) may include one or more controllers 560 including a test plan builder 570 and/or a test plan executor 580, for example. The test plan builder may determine the test configuration and the production data required for a test, for example. The test executor 580 may submit jobs to a queue 550 according to the test plan, for example. In some embodiments, a load generator 500 instantiates workers to retrieve jobs from the job queue and post to the production service 100. An auto-scaler 510 may scale the workers in response to metrics such as the quantity of jobs in the job queue, for example. An auto-shutdown mechanism monitors metrics to determine, based on the metrics, whether shutdown of the components implemented to simulate a load on production service 100 is required, in some embodiments. Scalable production test system 120, in some embodiments, may be implemented at a same entity as network-based production service 100. In alternate embodiments, scalable production test system 120 is implemented separately from network-based production service 100. In some embodiments, scalable production test system 120 may be provided as a separate service from production service 100. For example, at least some portions of scalable production test system 120 may be provided as a network-based service (e.g., third party service) remote to production service 100.

One or more controllers 560 are implemented to create and execute a test plan to simulate a load on production service 100. A test plan specifies the production data that will be replayed to production service 100. A test plan may also specify re-ordering of the data to achieve a given test profile, for example. A test profile of the test plan describes the simulated load for production service 100. For example, a test profile may be an increasing/decreasing load, a constant load and/or a peak load. Controller 560 includes test plan builder 570 and test plan executor 580 as illustrated in controller 560*a*, in some embodiments. Test plan builder 570 in controller 560*a* queries data store 130 to evaluate available data for a test plan. Test plan builder 570 creates a test plan based on the available data (e.g., production data 370 in FIG. 3) in data store 130 and the type of testing (e.g., direct replay of data, constant load, increasing load, etc.) desired, in some embodiments. For example, test plan builder 570 may evaluate start and end times for a given time period (e.g., individual minutes on a given date) and the size of the file corresponding to the data to determine the ordering of the production request data in the test plan, in some embodiments. In some embodiments, the test plan specifies a test profile that defines the rate and/or rate profile at which one or more controllers add jobs to the job queue. For example, data store 130 may be queried by test plan builder 570 to determine the number of files (e.g., production request data 370 in FIG. 3) and the size of the files for a given minute, as indicated by start and stop times, on a given date. Test plan builder 570 may query the same information over an hour or a day, for example, to determine the rate that the load is applied to network-based production service 100 during test. As another example, to stress (e.g., create a peak traffic test) network-based production service 100, several days worth of production request data may be combined to create a peak traffic test plan for a given test day. The production request data is combined for a standard timeframe from different standard timeframes to create a test load for the standard timeframe test larger than any of the individual timeframe loads, in some embodiments. For example, if the stress test were to determine the load to simulate peak traffic, test plan builder 570 may query the production data in the data store to determine the number and size of the files to create the desired load. In some embodiments, scalable production test system may provide an interface to allow a test administrator, for example, to specify the desired parameters for a given test. On or more controllers may receive the parameters via the interface and build an appropriate test plan.

In addition, in some embodiments, test plan builder 570 may query data store 130 for a sufficient amount of production data to create specific test profiles. A test profile may also be described as the rate at which production data is replayed to the network-based production service 100, for example. An example of a test profile may be a straight replay of data for a given time period (e.g., a day). In other embodiments, the test plan creates a constant load, where the production request data for a given time period is averaged out. In other embodiments, the load is an increasing load where the production data steadily increases or spikes suddenly. Alternatively, in some embodiments, the test profile is a decreasing load where large amount of production data is initially replayed and the amount steadily decreases. Finally, any combination of the above described test profiles can be created by test plan builder 570 to stress network-based production service 100, in some embodiments. The test profiles will be discussed in further detail in subsequent figures.

Test plan executor 580 generators jobs to carry out the test plan, in some embodiments. In some embodiments, test plan executor 580 in controller 560 implements the test plan created by test plan builder 570. Test plan executor 580 creates jobs and submits the jobs to the job queue in queue 550. Test plan executor 580 maintains the rate required to create the load profile in network-based production service 100 as specified by the test plan. In some embodiments, each job 540 that test plan executor 580 creates includes a link or pointer to the portion of production request data in data store 130 as indicated in the test plan. Test plan executor 580 may also includes instructions in jobs 540 for workers 530 as indicated by test plan builder 570, in some embodiments. Each job 540 specifies client requests (e.g. production request data) to be replayed by workers 530 to network-based production service 100.

In some embodiments, production test system 120 is configured to scale the number of controllers based on the size of the load to be simulated on production service 100. The number of controllers is scaled in response to the test plan. If the test plan indicated a large load, for example, that requires more than one controller for implementation the test plan, then controllers may be added to meet the demand of the test plan. In some embodiments, additional controllers 560 are implemented to complement the controller that created the test plan when executing the test plan. For example controller 560*a* includes test plan builder 570 and test plan executor 580. Based on the test plan created, more controllers may be needed to execute the test plan, in some embodiments. The additional controllers 560*n* are implemented to provide additional resources to create and submit jobs 540 to queue 550. For example, if the test plan created by test plan builder 570 in controller 560*a* has created a test profile included multiple days worth of data, a separate controller may be required to create and submit jobs 540 for each days worth of data. In addition, in some embodiments, controllers 560 are implemented with test plan builder 570 and test plan executor 580 on separate controllers.

In some embodiments, queue 550 is implemented to receive jobs from the controllers and provide workers jobs to replay to production service 100. Queue 550 identifies the status of jobs and provides a centralized point for determining the resources to complete the jobs. For example, the status of the jobs and the quantity of jobs in queue 550 may be used to determine whether to scale resources such as workers. Queue 550 may be implemented in scalable production test system 120 as illustrated in FIG. 5. In alternate embodiments, queue 550 is implemented separate from other components of scalable production test system or by a third party resource. Queue 550, accepts and manages jobs 540 from test plan executor 580 in controller 560. As jobs 540 are accepted from queue service 550, the status of each job (e.g., test job) is indicated by marking the job "taken" or "invisible", in some embodiments. "Taken" jobs 540 remain in the queue to ensure that in the event of a failure to complete job 540, job 540 is made available again in the queue, in some embodiments. Marking jobs 540 as "taken" or "invisible" ensure that once a job is accessed from queue service 550 by a worker 530, another worker 530 may not perform the "taken" job. Jobs 540 may become available again (e.g., marked "untaken" or "visible") if they are not marked complete prior a predetermined timeout, for example. For example, jobs 540 currently in progress in network-based production service 100 may be marked as "untaken" or "visible" if job 540 fails to complete. Job 540 may fail to complete due to worker failure, production service 100 failure, and/or network failure, for example.

In some embodiments, load generator 500 is provided to carry out jobs from the job queue to implement the test plan. In some embodiments, load generator 500 provisions workers to execute the jobs, scales the number of workers in response to metrics, and/or shuts down the test load on production service 100 in response to metrics. In some embodiments, load generator 500 comprises one or more workers 530, an auto-scaler 510 and auto-shut down module 520. Load generator 500 implements workers 530 in response to the test plan and scales the workers with auto-scaler 510 in response to metrics assessed on the job queue. For example, the status of the jobs in the job queue, may indicate the need for more workers. Load generator 500 monitors system metrics with auto-shutdown 520. These modules will be described in further detail below.

In some embodiments, a worker 530 accesses the next available job 540 from queue 550. Available jobs are marked as "untaken" in the job queue 550. Worker 530 accesses the production request data from data store 130 as indicated by the job and replays the production request data to the production service. In some embodiments, a worker 530 is generic such that any implemented worker can access any untaken job, regardless of the nature of the test plan and/or production service. When a worker 530 accesses a job (e.g., test job) from queue 550, the job 540 is marked as "taken" and that job 540 is ineligible to be taken by other workers 530, in some embodiments. However, as discussed above, a job 540 remains in queue service 550 until completed. After a predefined amount of time has elapsed without a "taken" job being completed, the job may again be marked as "untaken" and become available for a worker 530 to accesses. Worker 530 retrieves the production request data from data store 130 indicated by job 540. Worker 530 decrypts the production request data from data store 130 and applies any instructions from job 540 to the decrypted production request data. An example of an instruction may be transforming the date and time of the production data to the current date and time prior to posting job 540 to network-based production service 100. Worker 530 then replays the client requests captured in the production request data to network-based production service 100.

In some embodiments, auto-scaler 510 scales the number of workers 530 in response to metrics. The quantity of workers 530 implemented by load generator 500 may scale up or increase in response to one or more metrics. The quantity of workers implemented by load generator 500 may scale down in response to one or more metrics. In addition, workers may be scaled separately from the controllers implementing the test plan. For example, controllers may scale in response to the quantity of jobs that will be submitted to the job queue 550, whereas workers may be scaled in response to the quantity of jobs already in job queue 550. In some embodiments, the metrics for determining scaling of workers 530 are one or more job quantity metrics and/or one or more worker load metrics. A job quantity metric monitors the quantity of jobs 540 in queue 550 and in response to the quantity of jobs exceeding a given threshold, auto-scaler 510 may implement more workers. A worker load metric comprises monitoring system metrics such as memory usage, CPU usage, disk usage and/or network usage for the computing resource(s) used to implement the worker(s). In response to at least one of these metrics being above a threshold, more workers may be implemented by load generator 500.

In addition, in some embodiments, auto-scaler 510 scales (e.g. increases or decreases) the implementation of workers 530 in scalable production test system 120 in a predictive manner. In some embodiments, since the test plan is known and the available production request data for replay is known, auto-scaler 510 can look ahead at the plan or the production request data to determine how to scale workers 530. For example, in response to the look ahead, auto-scaler 510 schedules an increase or decrease in the number of workers based on the predicted change according to the test plan. Auto-scaler 510 can scale workers 530 in advance of or concurrently with controller 560 and/or test plan executor 580 creating and submitting jobs 540 in queue 550. For example, if there are currently 800 workers and twenty minutes from now the load will increase by 10%, 80 more workers may be initiated (e.g., gradually) in preparation for the increase in load. Conversely, if the load will decrease by 10% in the near future, 80 workers may be slowly decommissioned.

In some embodiments, auto-shutdown module 520 is implemented to monitor and preserve the health of network-based production service 100 and/or other computing resources used to carry out the test. Auto-shutdown module 520 is configured to monitor one or more system metrics and determine whether to shutdown the test load on the production service (e.g., network-based production service 100 in FIG. 1) in response to the system metrics. In some embodiments, the system metrics include the number of test jobs in the job queue (e.g., queue 550), the number of untaken jobs in the job queue and/or the number of taken test jobs in the job queue. In some embodiments, auto-shutdown 520 compares the metrics described above to a given threshold to determine if auto-shutdown is needed. In some embodiments, if the size of queue 550 grows such that workers 530 are not accessing jobs at an expected rate, auto-shutdown 520 instructs controller 560 to shut down and/or delete the queue. In some embodiments, if there are too many taken jobs 540 or too many untaken jobs in queue 550, auto-shutdown 520 instructs controller 560 to shut down and/or delete the queue. Too many taken jobs 540 may indicate that there are too many jobs applied to network-based production service 100 or that workers 530 are stalled on particular jobs posted to network-based production service 100, for example. Too many untaken jobs may be indicative that workers 530 may not be able to handle the current load, for example. In some embodiments, when a maximum number of workers is reached auto-shutdown 520 shuts down scalable production test system 120. If the maximum number of workers (e.g. workers 530) is reached and more workers 530 are necessary to complete the jobs, for example, that may be indicative of problems in scalable production test system 120. In some embodiments, the success rate of each worker 530 is monitored to determine the number of jobs handled successfully and unsuccessfully. If a certain percentage of jobs are failing in a predetermined amount of time, auto-shutdown 520 will shut down the worker. In some embodiments, workers 530 will automatically shutdown in response to reaching a certain percentage of failing jobs, for example. In some embodiments, if too many (e.g., compared to a threshold) workers 530 are auto-shutdown, auto-shutdown 520 will instruct controller 560 to also shutdown (e.g., delete the job queue and stop the test). Too many workers 530 shutting down may indicate larger issues such as network problems or problems with network-based production service 100 under test, for example.

Figure 6:
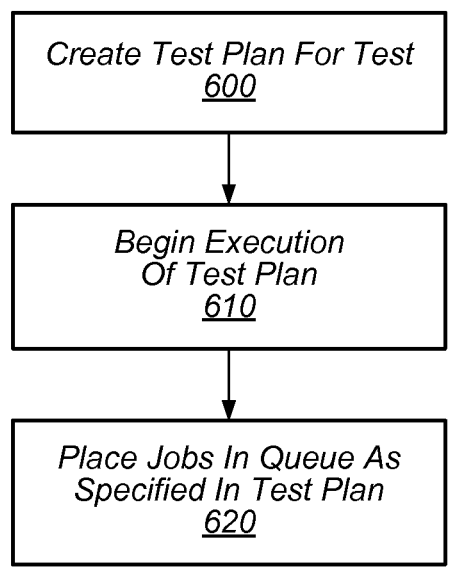
FIG. 6 is a flowchart of a method for implementing a test plan, according to one embodiment.

FIG. 6 is a flowchart of a method for implementing a test plan, according to one embodiment. In general, as discussed above, a test plan is created, e.g., by one or more controllers 560 depicted in FIG. 5 based on the production data available in data store 130 depicted in FIG. 5, in some embodiments. The test plan may be created automatically based on the production request data available or engineered to create a test plan with a particular test profile (e.g., constant load, increasing load, etc.) for the production service under test (e.g., network-based production service 100 in FIG. 5). The test plan is executed by controllers 560 creating and placing test jobs in a job queue (e.g., queue 550 in FIG. 5) at the rate specified by the test plan.

As indicated in 600, a test plan for test is created. In some embodiments, the test plan is created by a test plan builder (e.g. test plan builder 570 in FIG. 5) in a controller (e.g. controller 560 in FIG. 5) querying the available production request data (e.g., production request data in data store 130 in FIG. 5). In some embodiments, the test plan indicates that the production data is to be replayed in the same order and time intervals as it was captured. In some embodiments, the test plan indicates that the production data is to be re-ordered or grouped to create a particular test profile. For example, a test profile may be created by re-ordering the production request data to provide constant loading or decreasing loading of the production data replayed to simulate a load in a production service (e.g., network-based production service 100 in FIG. 5). As another example, the test plan may combine production request data from a similar time frame from multiple days to simulate peak traffic in the production service. In some embodiments, the test plan may include instructions corresponding to the data. For example, the time stamps saved with the production request data may need to be altered to reflect the current time. In some embodiments, the test plan may filter the production data by the metadata stored with the production data. For example, a test plan for a retail website that has websites for multiple countries may be created by filtering the data by the website address. For example, if the test plan indicated that only the production service hosting the German version of the retail website will be tested, the production data may be filtered to include only production data originally sent to the German site, e.g., with ".de" at the end of the website address.

As indicated in 610, execution of the test plan begins. In some embodiments, a test plan executor 580 in controller 560 as depicted in FIG. 6 executes the test plan. If a single controller (e.g., controller 560 in FIG. 5) is not able to handle placement of the jobs in the job queue (e.g., queue 550 in FIG. 5) at the rate indicated by the test plan, one or more controllers (e.g. controllers 560 in FIG. 5) are added. For example, if the test plan created a test profile combining three days worth of data into a single day to create a more stressful test profile, three controllers may be implemented to create test jobs for each day's worth of data in parallel.

As indicated in 620, the jobs are placed in the queue according to the test plan. In some embodiments, the jobs (e.g. jobs 540 in FIG. 5) are created by a controller (e.g. controller 560 in FIG. 5) as indicated by the test plan. The jobs are placed in the queue (e.g. controller 560 placing jobs 540 in queue 550 as depicted in FIG. 5) at a specified rate. The rate that the jobs are applied to the queue, ensures that the specified test or load profile (e.g., constant, increasing, etc.) is created by the workers posting the jobs to the production service, for example. In some embodiments, the jobs (e.g. jobs 540 in FIG. 5) comprise links or pointers to the production data (e.g., production data in data store 130). In some embodiments, instructions associated with the job are included in the job. For example, the instructions may indicate that the date and time corresponding to the production data must be changed by the workers (e.g. workers 530 in FIG. 5) prior to posting the job to the production service. In some embodiments, the jobs placed in the job queue are place by one or more controllers.

FIGS. 7A-D are charts depicting a set of test profiles, according to one embodiment. In general, as discussed above, the test plan determines the test or load profile. Each test profile may stress or test certain aspects of the production service under test (e.g., network-based production service 100 in FIG. 1). For example, an increasing or decreasing load may test the production services capability to scale in response to the load.

Figure 7A:
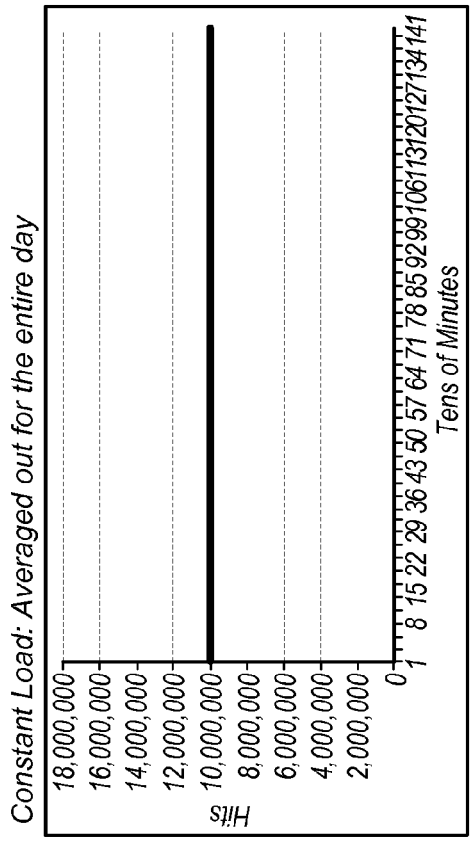
FIGS. 7A-D are charts depicting a set of test profiles, according to one embodiment.

FIG. 7A depicts a straight replay of a single day's data for a retail website. As described in the above figures, client requests are captured on an ongoing basis and stored according to predetermined standard time frames and intervals. In this example, each time interval has millions of client requests (e.g. website hits). The number of client requests peaks at 16 million requests. To simulate this load, the test plan builder in controller 560 as depicted in FIG. 5 creates a test plan by querying the production data (e.g. production data in data store 130 in FIG. 5) corresponding to the day depicted in the figure. When the test plan to complete a straight replay is executed, test jobs are created and submitted (e.g. by controller 560 in FIG. 5) at a rate corresponding to the original rate to simulate the same load on the production service under test.

Figure 7B:
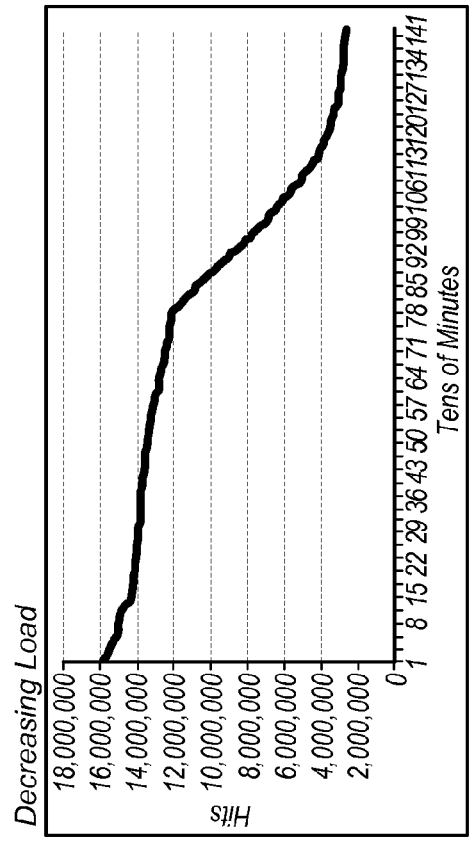

FIG. 7B depicts a constant load to be applied for a given time frame. In this example a constant load is maintained at ten million hits throughout the entire time frame (e.g., day). As described in the above figure, client requests are captured on an ongoing basis and stored at a predetermined standard interval. To create the constant load, the test plan builder (e.g., test plan builder 570 in FIG. 5) queries the production request data (e.g., production request data in data store 130 in FIG. 5). Based on the information received, the test plan builder may re-arrange the client request stored in the production request data to create a test profile simulating a constant load. When the test plan is executed, the test jobs with the re-arranged data are submitted at the appropriate rate as indicated by the test plan to ensure a constant load in the production service under test. A constant load test may be created to ensure that the production service under test can maintain a constant level of service over a given time frame, for example. To simulate any type of load, the controllers and workers may scale independently in response to the changing demands of the test profile. In addition, the auto-shutdown capabilities described above may determine that the test must be shut down to preserve production system operation for the clients, for example.

Figure 7C:
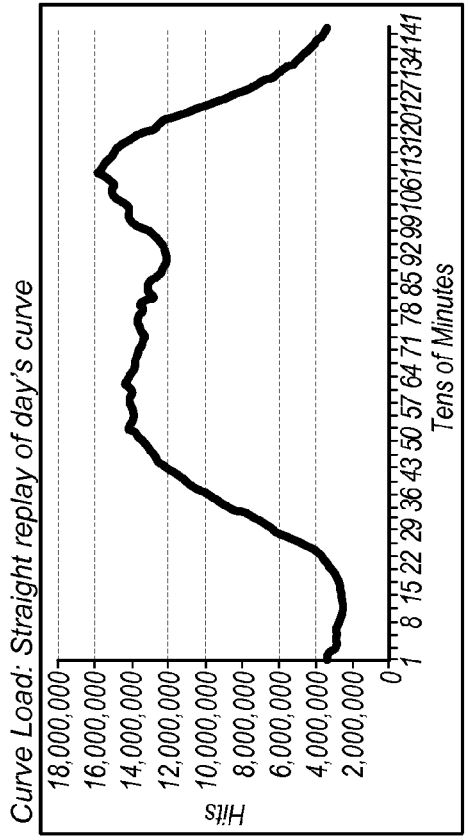

FIG. 7C depicts an increasing load to be applied for a given time period. As described in the above figures, client requests are captured on an ongoing basis and stored at predetermined standard time intervals. In this example, each time interval has millions of client requests (e.g. website hits). The number of client requests start slightly above two million hits and peaks at 16 million hits or client request. To create the increasing load, the test plan builder (e.g., test plan builder 570 in FIG. 5) queries the production data (e.g., production data in data store 130 in FIG. 5) to determine the available data. In some embodiments, the client request data in the available production request data is re-arranged to create a test profile simulating an increasing load. In other embodiments, the production data from one time period is combined with production data from another time period with similar time frames to create the increasing load. An increasing load may be used to test that the components of the production service under test work appropriately in response the increasing load. An increasing load test may also indicate where the breaking point is of the production service under test. For example, at a given point in the test, the metrics of the production service may indicate that the traffic on the production service is maximizing the capabilities of the components (e.g., CPU and/or memory usage) of the production service. For this type of load, the controllers and workers may scale independently in response to the changing demands of the test profile. In addition, the auto-shutdown capabilities described above may determine that the test must be shut down to preserve production system operation for the clients, for example.

Figure 7D:
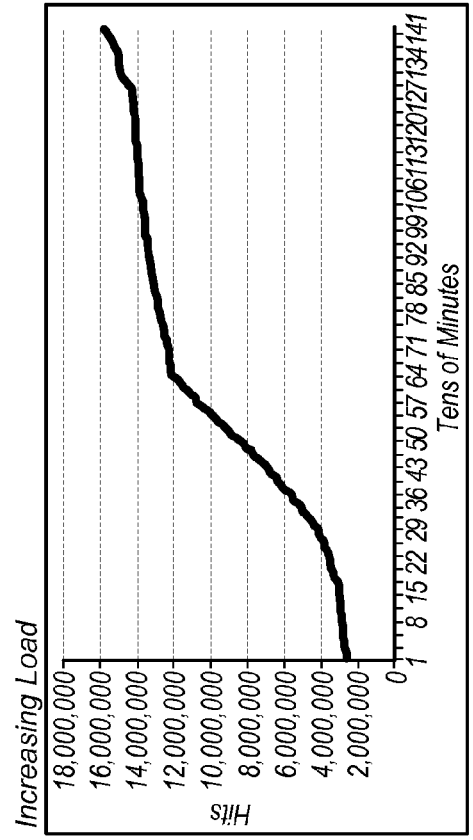

FIG. 7D depicts a decreasing load to be applied for a given time period. As described in the above figures, client requests are captured on an ongoing basis and stored at a predetermined standard time interval. In this example, each time interval has millions of client requests (e.g. website hits). The number of client requests begins at 16 million requests and decreases at slightly above two million requests. As discussed above, to create the decreasing load, the test plan builder (e.g., test plan builder 570 in FIG. 5) queries the production data (e.g., production data in data store 130 in FIG. 5) to determine the available data. In some embodiments, the client requests stored in the available production data is re-arranged to create a decreasing load. In other embodiments, the available production request data from one time period is combined with production data with similar timeframes from another time period to create the decreasing load. A decreasing load may be used to test that the components of the production service under test scale down appropriately in response the decreasing load. A decreasing load test may also determine how the production service under test responds to an unexpected decrease in client requests (e.g., from the initial peak of data). For this type of test profile, as described above the controllers and workers may scale independently in response to the changing demands of the test profile. For this type of load, the controllers and workers may scale independently in response to the changing demands of the test profile. In addition, the auto-shutdown capabilities described above may determine that the test must be shut down to preserve production system operation for the clients, for example.

Figure 8:
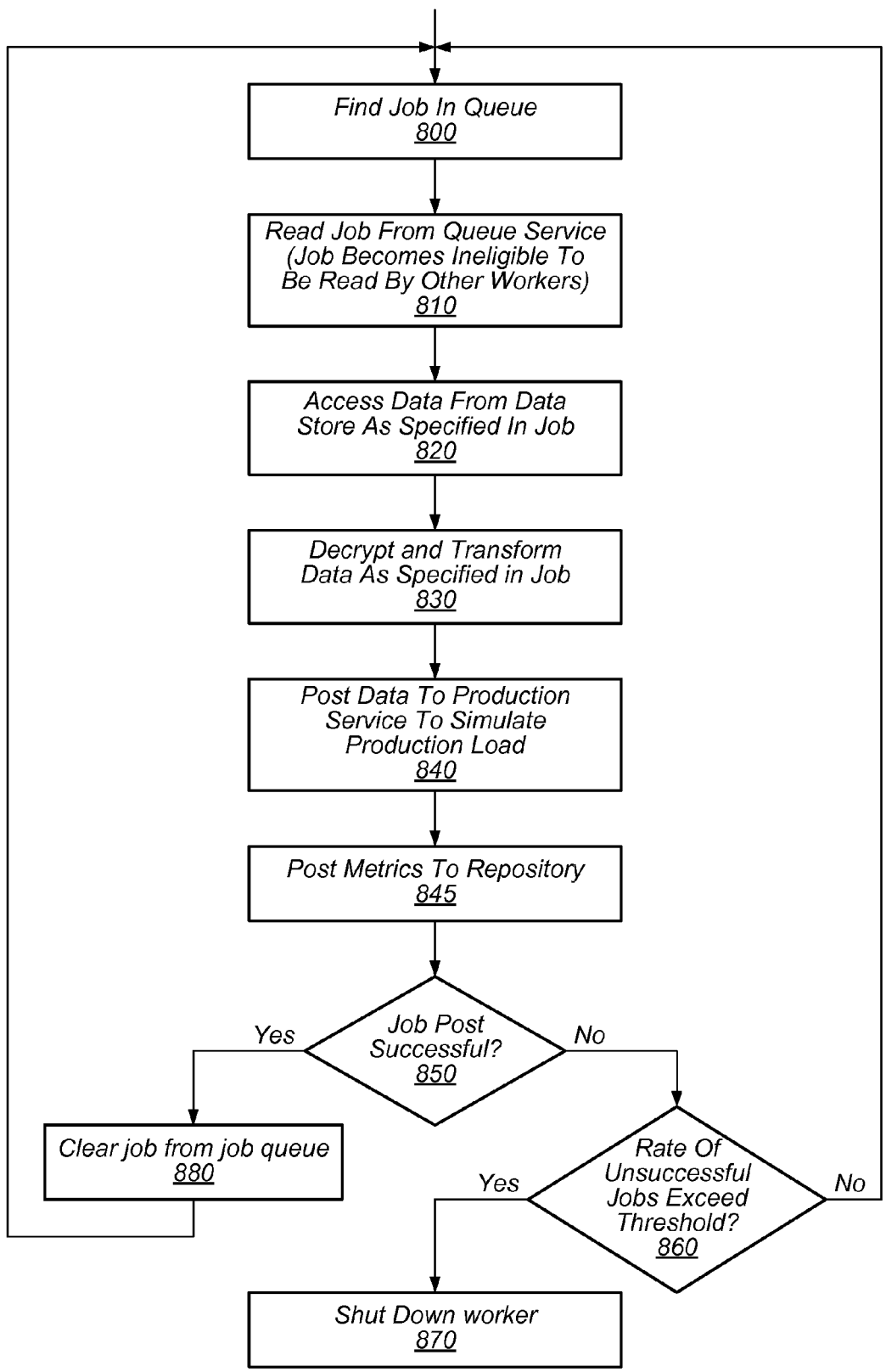
FIG. 8 is a flowchart of a method for workers executing test jobs, according to one embodiment.

FIG. 8 is a flowchart of a method for workers executing jobs, according to one embodiment. In general workers (e.g. workers 530 in FIG. 5) access jobs from a job queue (e.g. jobs 540 in queue 550) and replay the data from the job to the production service under test (e.g., network-based production service 100 in FIG. 5). In addition, each of the jobs (e.g. jobs 540 in FIG. 5) may have corresponding instructions that workers (e.g., workers 530) execute prior to replaying the production data to network-based production service 100.

As indicated in 800, a worker accesses a job queue (e.g., job queue 550 in FIG. 5) to find a job. For example, jobs may be ordered by age in the job queue. When a worker access the job queue for a job, the oldest available (e.g., untaken) job may be indicated to the worker.

As indicated in 810, in some embodiments, the job is read from the queue (e.g., queue 550), e.g., by a worker. As discussed above, reading the job from the queue marks the job as "taken. A jobs marked as "taken" is ineligible to be read by other workers, but the job remains in the queue, in some embodiments. If the job fails to complete, in some embodiments, the job may be remarked as "untaken" so that the job is again available for a worker to access.

As indicated in 820, the production request data (e.g. production request data in data store 130 in FIG. 5) specified in the job (e.g. job 540 in FIG. 5) is accessed from the data store (e.g., data store 130 in FIG. 5), e.g., by a worker that has taken the job. The data is decrypted and transformed as specified in the job, as indicated in 830, in some embodiments. As described above, a transformation may be a change in the original date and time corresponding to the decrypted data, for example.

As indicated in 840, the decrypted and transformed data (e.g., production request data from data store 130 in FIG. 5) is posted to the production service to simulate a production load. Once the job (e.g., job 540) is posted to the production service (e.g. network-based production service 100), as indicated in 850, the job success is determined, in some embodiments. For example, once the job completes, notification may be sent by the worker (e.g., worker 540 in FIG. 5) to the queue (e.g., queue 550 in FIG. 5) indicating that the job (e.g. job 540) can be deleted from the queue, as indicated in 880. The worker that processed the completed job can access the next untaken job in the job queue (e.g., return to 800).

As indicated in 845, metrics corresponding to the data posted to the production service are posted to a metrics repository. Examples of the metrics posted are success and/or fail of the request/data posted to the production service, latency for posting data to the production service, latency of the response to the posted data, and/or the amount of data sent when posting data to the production service at 840. The metrics data for all workers is aggregated, in some embodiments, to assess the health of the production service and/or load generator (e.g., load generator 500 in FIG. 5). This information may be used for an autoshutdown process of the test as described below.

As indicated in 860, if the job post was not successful, the rate of unsuccessful jobs is checked to determine if the rate exceeds a threshold. A job (e.g., job 540) may be unsuccessful if it does not complete within a given time period, for example. A job may fail because a worker stopped processing, due to a systemic issue in the production service under test and/or due to a network issue, for example. The threshold may be put in place, for example, to ensure that the workers (e.g., workers 530 in FIG. 5) accessing jobs from the job queue (e.g., queue 550 in FIG. 5) and posting them to the production service (e.g. network-based production service 100 in FIG. 5) are processing the jobs at a rate as specified by the test plan. In some embodiments, the success rate of a given work is compared to a threshold. If the threshold has been exceeded, in some embodiments, the worker is shut down as indicated in 870. The worker may be shutdown by auto-shutdown module 520 as depicted in FIG. 5. If the threshold has not been exceeded, then the worker may access the next available job (e.g., return to 800), in some embodiments.

As discussed above, when a job fails, if the threshold for the rate of unsuccessful jobs has not been exceeded, the worker returns to the queue to find the next job (e.g., step 800). In addition, if the job completed successfully, the worker returns to the queue to find the next job (e.g., step 800). A given worker may, in some embodiments, begin a new job while waiting from acknowledgment from the production service that the request(s) for a job have been received or completed. The worker may discard any results from the production service for the replayed request(s) for a job. Multiple jobs may be processed by multiple workers in parallel.

Figure 9:
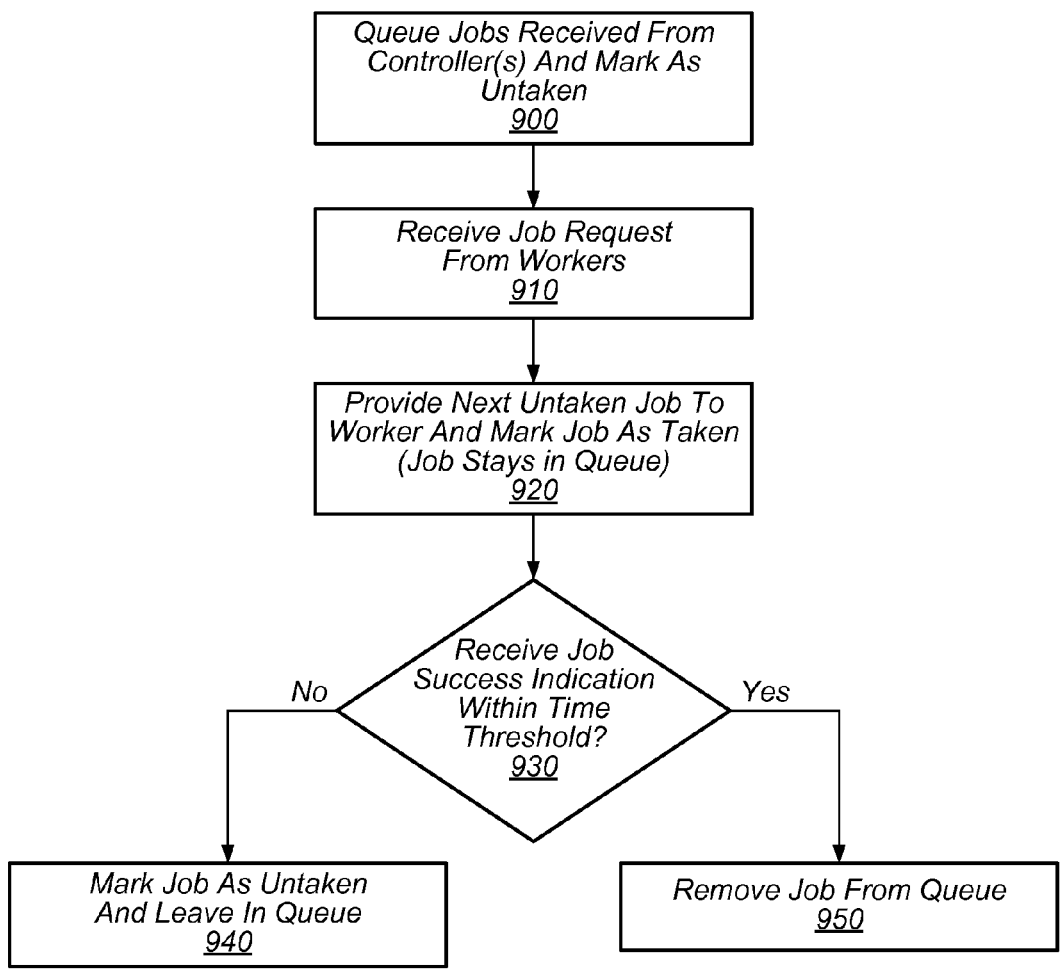
FIG. 9 is a flowchart of a method for job queue management of test jobs, according to one embodiment.

FIG. 9 is a flowchart of a method for job queue management of test jobs, according to one embodiment. In general, a job queue is implemented to facilitate efficient work flows in a test system (e.g., scalable production test system 120 in FIG. 5), in some embodiments. Job queue (e.g., queue 550 in FIG. 5) may be implemented either internal or external to the test system, for example. The test system may typically process many tasks in parallel and the job queue ensures that the next task is available as each task completes, for example. In addition, in the scalable production test system 120 depicted in FIG. 5, the job queue 550 decouples the controllers 560 submitting jobs to the queue from the workers 530 accessing jobs from the queue. This allows the controllers and workers to scale separately and independently from each other. To manage, the queue, the jobs may be marked to indicate their status, in some embodiments.

As indicated in 900, jobs are received from one or more controllers and marked as untaken. Marking the jobs as untaken indicates that the jobs are available for access by a worker (e.g., by workers 530 in FIG. 5). As discussed above, a job (e.g. job 540 in FIG. 5) comprises a link or a pointer to production data for replay and instructions for the data, in some embodiments.

As indicated in 910, a request for a job is received from a worker (e.g., workers 530 in FIG. 5).

As indicated in 920, the next untaken job is provided to the worker and the job is marked as taken. However, the job remains in the queue until notification of completion is received. Marking the job as taken ensures that another worker does not access the job while it is progress, in some embodiments.

As indicated in 930, in some embodiments, jobs are expected to complete within a time threshold. In some embodiments, if the job (e.g., job 540 in FIG. 5) does not complete within a particular time threshold, the job is marked as untaken in the queue (e.g., queue 550 in FIG. 5). Marking the job as untaken makes it available in the queue again for another worker (e.g., worker 530 in FIG. 5) to request, as indicated in 940. In some embodiments, if the indication of job success was received prior to the time threshold, the job is removed from the queue (e.g., queue 550 in FIG. 5) as indicated in 950.

Figure 10:
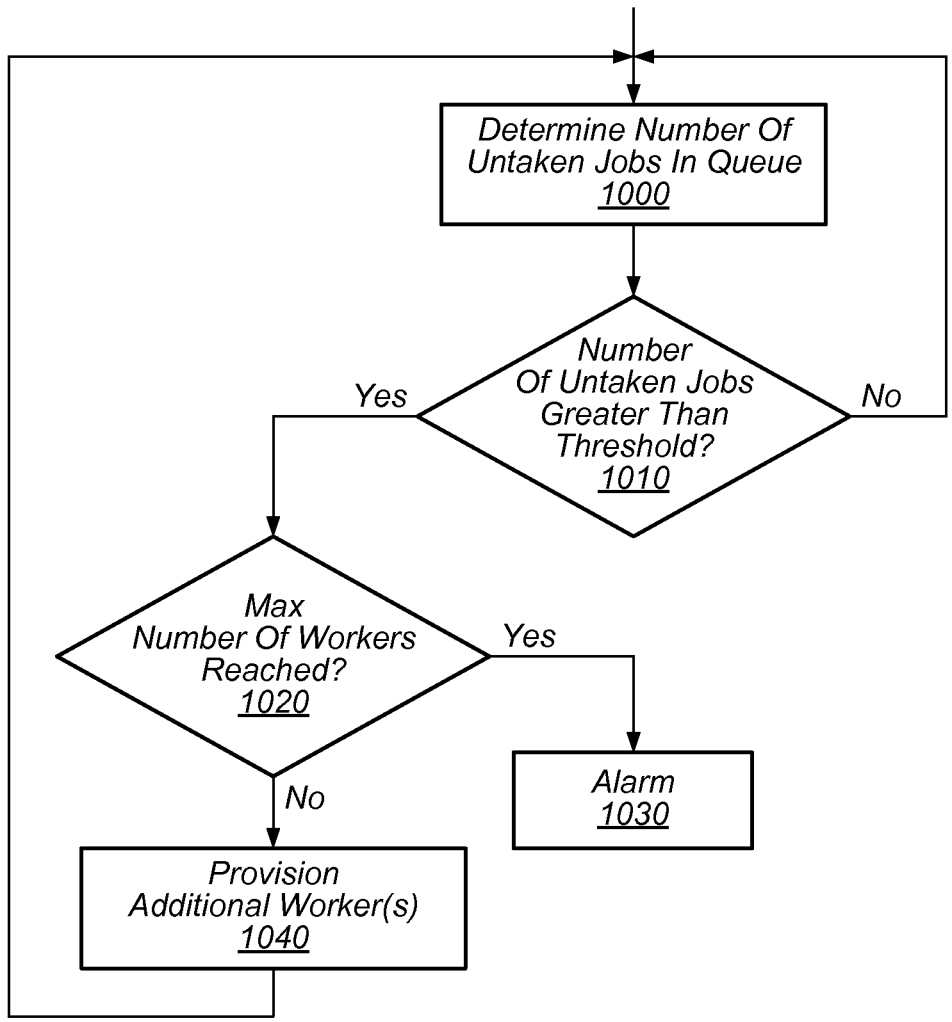
FIG. 10 is a flowchart of a method for auto-scaling workers in response to job metrics, according to one embodiment.

FIG. 10 is a flowchart of a method for auto-scaling workers in response to job queue metrics, according to one embodiment. In general, auto-scaling ensures the test plan is implemented as designed and the appropriate amount of compute resources (e.g., workers) are available for test jobs, tasks or processes. For example, as described above in FIGS. 7A-D, the simulated loads may range from a curved load, to a constant load and/or a increasing/decreasing load. The different loads utilize different amounts of controllers and workers as depicted in FIG. 5 at different times. Scaling may be performed to ensure adequate resources and avoid underutilized resources (e.g., compute and memory resources for workers 530 and controllers 560 in FIG. 5). In some embodiments, one indicator of auto-scaling success is the that the number of the jobs (e.g., jobs 540 in FIG. 5) in the job queue (e.g., queue 550 in FIG. 5) maintains a minimum size approaching zero.

As indicated in 1000, the number of untaken jobs in the queue (e.g. queue 550 in FIG. 5) are determined. As discussed above, untaken jobs are jobs that are available for access by a worker (e.g., by workers 530 in FIG. 5) for posting to the production service under test (e.g., network-based production service 100 in FIG. 5). In some embodiments, the auto-scaler (e.g., auto-scaler 510 in FIG. 5) determines the number of untaken jobs via a job quantity metric, for example. As discussed above, jobs are continually placed in the job queue (e.g., by controllers 560) according to a test plan, in some embodiments. In some embodiments, the auto-scaler is configured to maintain a minimal queue size and ensure that once a job is place in the queue, it is accesses and processed in a time frame corresponding to maintaining a minimal queue size.

As indicated in 1010, the number of untaken jobs is compared to a threshold by auto-scaler 510 as depicted in FIG. 5. If the number, is below the threshold, the auto-scaler returns to 1000 and continues to monitor the number of untaken jobs in the job queue.

As indicated in 1020, if the number of untaken jobs (e.g. jobs 540 in FIG. 5) is greater than a threshold, the auto-scaler determines if more workers can be added. In some embodiments, predetermining a maximum number of workers ensures the health of the production system under test. If the maximum number of workers has been reached and scaling the number of workers up would exceed the maximum number of workers, then as indicated in 1030, an alarm occurs. The alarm may be utilized to ensure that the number of workers does not grow unchecked, such that the test processes may inhibit real client requests and affect the client experience in the production system. In some embodiments, the alarm may serve as an alert. In alternate embodiments, the alarm may initiate auto-shutdown (e.g. by auto-shutdown module 520 in FIG. 5) of the scalable test production system depicted in FIG. 5.

As indicated in 1040, if the maximum number of workers has not been reached, one or more additional worker are provisioned. Provisioning additional workers (e.g., scaling up), may ensure that untaken jobs (e.g., in queue 550 in FIG. 5) continue to be accessed and posted to the production service under test (e.g. production service 100 in FIGS. 1 and 5) in the time frame indicated by the test plan, for example. After provisioning an additional worker(s), the auto-scaler (e.g., auto-scaler 510 in FIG. 5) returns to step 1000 to continue the process.

Figure 11:
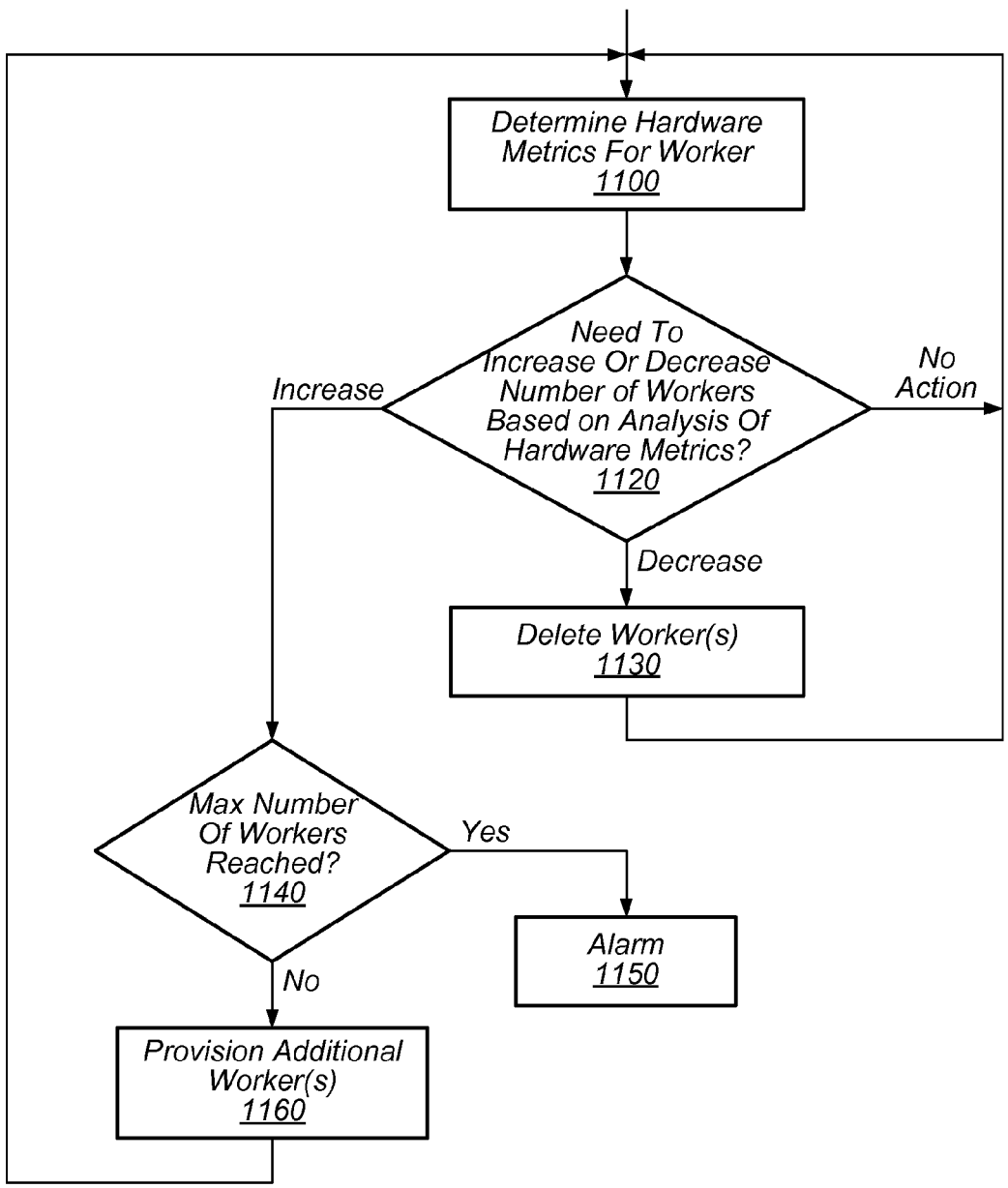
FIG. 11 is a flowchart of a method for auto-scaling the number of workers in response to system metrics, according to one embodiment.

FIG. 11 is a flow chart of a method for auto-scaling the number of workers in response to system metrics, according to one embodiment. In general, as discussed above, auto-scaling is a technique that ensures the test plan is implemented as designed and the appropriate amount of compute resources are available for test jobs, tasks or processes, in some embodiments. As discussed above, the test load on the production test service may be a curved, increasing/decreasing or constant load. Auto-scaling may be implemented to avoid idle compute resources, for example. In addition, if the compute resources are not scaled up to meet demand, the test may not execute as intended. In some embodiments, auto-scaling may monitor key metrics of the scalable test system to determine if auto-scaling is needed. Examples of metrics are memory, CPU, disk or network usage of the resources used to implement workers.

As indicated in 1100, hardware metrics for workers (e.g., workers 530 in FIG. 5) are determined and monitored. Examples of hardware metrics are memory, CPU, disk or network usage. In some embodiments, a predetermined threshold or operational criteria is determined for each metric.

As indicated in 1120, based on the hardware metrics the auto-scaler determines if the number of workers needs to increase. For example, if CPU or memory usage on a system implementing a worker is too, the worker may not be able to keep up with the test job rate and one or more additional workers should be provisioned. In some embodiments, if the hardware metrics indicated that usage meets particular criteria or has not fallen below a particular threshold, no action may be taken and the auto-scaler returns to 1100 and continues to monitor the hardware metrics.

As indicated in 1130, workers (e.g. workers 530 in FIG. 5) are deleted based on the analysis of hardware metrics in 1120. For example, if the hardware metrics have fallen below a predetermine criteria or threshold, the compute resources (e.g., workers 530 in FIG. 5) may be idle or under utilized. The idle workers are deleted in some embodiments. In some embodiments, a minimum number of workers is established. Once the minimum is reached, no more workers are deleted even if they are idle or under utilized.

As indicated in 1140, based on the analysis of the hardware metrics in 1120, the number of workers needs to increase, and the number of workers (e.g., workers 530 in FIG. 5) is evaluated to determine if a maximum number has been reached. As discussed above, in some embodiments, a maximum number of workers is determined to ensure the health of the production service (e.g., network-based production service 100 in FIG. 5). As discussed above, if the number of workers is allowed to grow unchecked, the workers may interfere with real client requests in the production system 100.

In some embodiments, if the maximum number of workers (e.g., workers 530 in FIG. 5) has been reached, an alarm occurs, as indicated in 1150. As discussed above, the alarm serves as an alert or initiates auto-shutdown (e.g., auto shutdown module 520) of the scalable test production system 120, in some embodiments. If the maximum number of workers has not been reached, in some embodiments, one or more additional workers are provisioned, as indicated in 1160. Once the additional workers are provisioned, the hardware metrics continue to be monitored in 1100, in some embodiments.

Additionally, in some embodiments, the methods of FIGS. 10 and 11 may be combined. In some embodiments, both the hardware metrics and the queue size in the scalable test system are monitored to determine whether auto-scaling of the workers is needed. Monitoring the hardware metrics may ensure effective use of resources, for example. Monitoring the job queue may ensure that the test plan is implemented as designed, for example.

Figure 12:
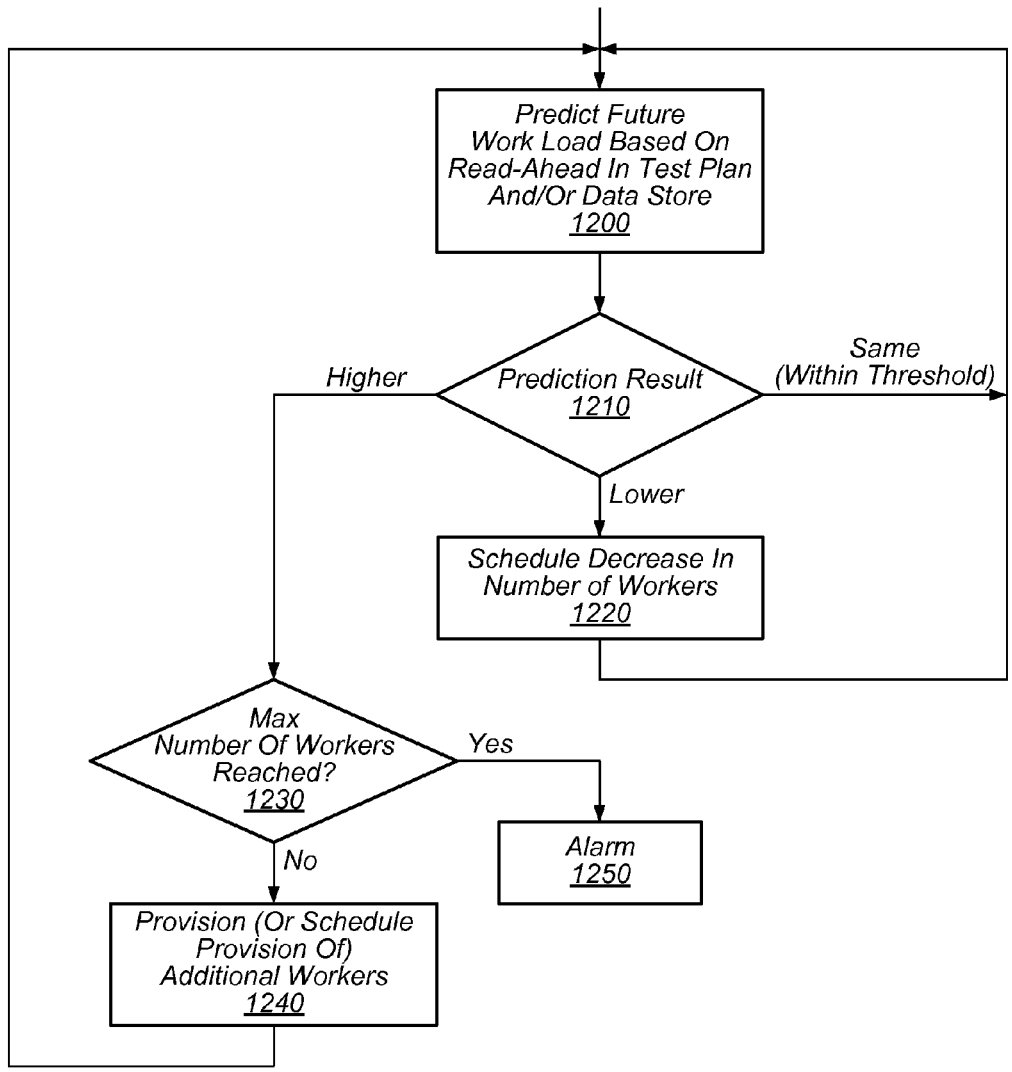
FIG. 12 is a flowchart of a method implementing predictive auto-scaling during execution of a test plan, according to one embodiment.

FIG. 12 is a flowchart of a method implementing predictive auto-scaling of workers, according to one embodiment. In general, auto-scaling workers can be completed in a predictive manner. As described above, a test plan is created (e.g., by test plan builder 570 in FIG. 5) based on the production data (e.g., in production data in data store 130 in FIG. 5). Since the test plan and the production data are deterministic, it is possible to predict increases in the load for the scalable production test system under test, for example. For example, advance knowledge of increasing loads may indicate a need for more workers in the near future. Conversely, advance knowledge of decreasing loads may indicate an opportunity to decrease the number of workers in the near future, for example.

As indicated in 1200, the future work load is predicted based on a read-ahead in the test plan and/or data store. As discussed above, production data (e.g., production request data 370 in FIG. 3) captured from client requests are stored for use in testing the production service (e.g., network-based production service 100 in FIG. 5), in some embodiments. In some embodiments, a test plan is determined, e.g., by controllers (e.g., controller 560 in FIG. 5), based on the production data (e.g. production data in data store 130 in FIG. 5). Given at least one of the known values (e.g., production data and/or test plan), the future work load may be predicted by the auto-scaler 510, in some embodiments.

As indicated in 1210, based on the results of the read-ahead, the number of workers (e.g., workers 530 in FIG. 5) may increase, decrease or stay the same. In some embodiments, if the prediction results indicated the work load is unchanged, there is no need to adjust the number of workers so return to reading ahead in 1200.

As indicated in 1220, based on the prediction result from the read-ahead in the test plan (e.g., determined by controller 560 in FIG. 5) and/or data store (e.g., data store 130 in FIG. 5), a decrease in workers is scheduled. At this point the read-ahead of the test plan and/or data store continues in 1200, in some embodiments.

As indicated in 1230, based on the prediction results from the read-ahead in the test plan and/or data store, an increase in workers is needed. However, in some embodiments, the current number of workers (e.g., workers 530 in FIG. 5) is evaluated to determine if a maximum threshold has been reached. If a maximum threshold has been reached, as indicated in 1250, an alarm occurs in some embodiments. In some embodiments, the alarm initiates auto-shutdown (e.g., by auto shutdown module 520 in FIG. 1) of the scalable test system or provides an alert.

As indicated in 1240, the maximum number of workers has not been reached so additional workers (e.g., workers 530 in FIG. 5) are scheduled or provisioned by auto-scaler 510 depicted in FIG. 5. At this point the read-ahead of the test plan and/or data store continues in 1200, in some embodiments.

Once additional workers have been provisioned, the method returns to step 1200 and continues to read-ahead in the test plan and/or data store. In some embodiments, auto-scaling based on metrics (as discussed in regard to FIGS. 10 and/or 11) and based on read-ahead of the test plan and/or data store (as discussed for FIG. 12) may be combined such that some or all of the techniques may be used together for scaling workers.

Figure 13:
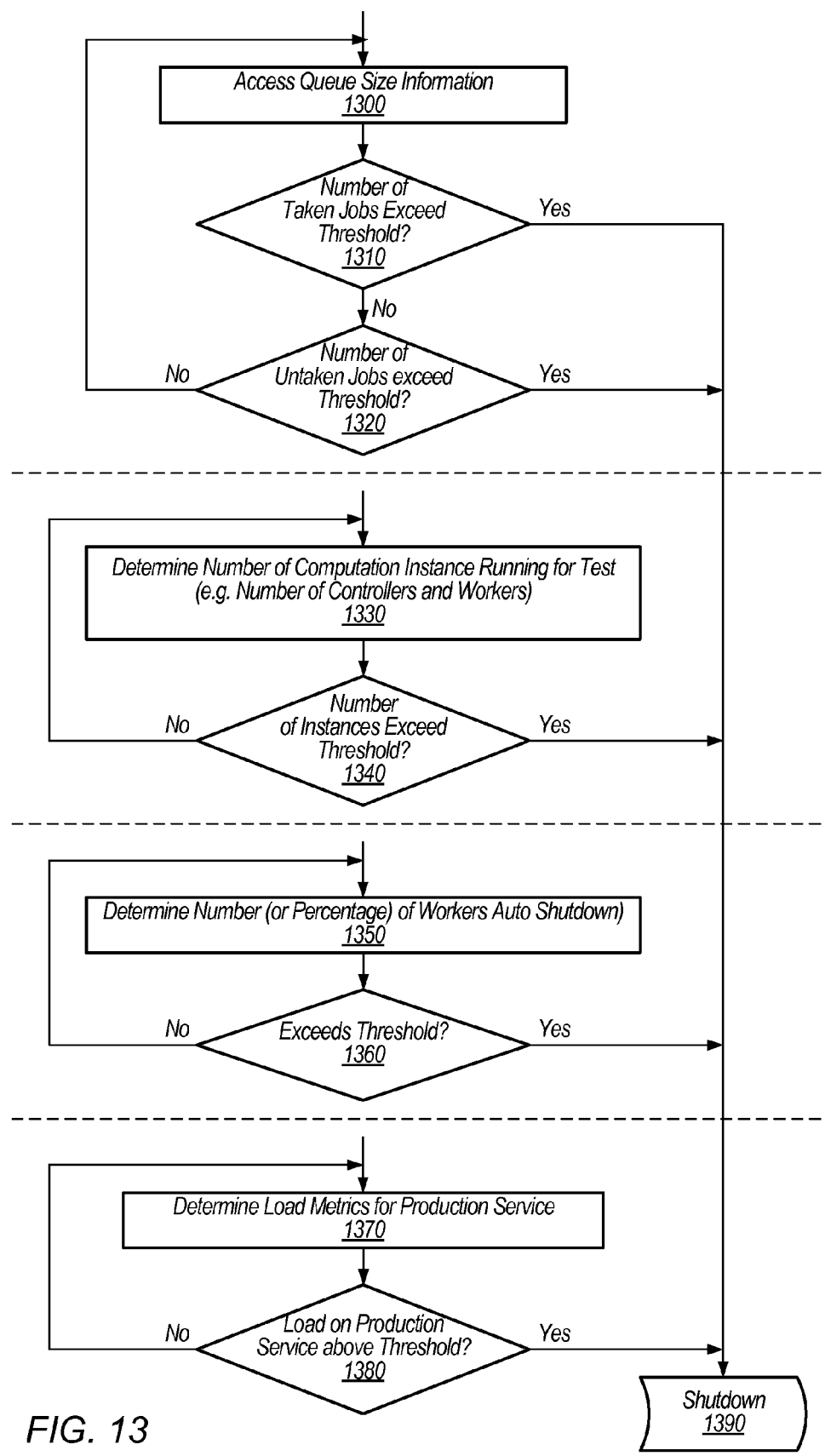
FIG. 13 is a flowchart of a method for auto-shutdown of a scalable production test system, according to one embodiment.

FIG. 13 is a flowchart of a method for auto-shutdown of a scalable test system, according to one embodiment. In general, as discussed above, the scalable production test system as depicted in FIGS. 1 and 5) is implemented to test a production service in real-time and with real data (e.g. captured client request data stored for subsequent use). Given the risks with implementing testing in a production environment, in some embodiments, auto-shutdown is implemented to ensure real client requests are not inhibited and/or the production service itself is not shut down.

As indicated in 1300, in some embodiments, the queue size information is accessed. The size of the queue (e.g., queue 550 in FIG. 5), in some embodiments, indicates if jobs (e.g., jobs 540 in FIG. 5) are executing as defined by the test plan. For example, in a well provisioned test system, the number of jobs in the job queue should be near zero. As indicated in 1310, in some embodiments, if the number of taken jobs exceeds a given threshold, auto-shutdown occurs, as indicated in 1390. If the number of taken jobs exceeds a given threshold, this may indicate that workers are stuck on a job or that many jobs have failed, for example.

As indicated in 1320, in some embodiments, if the number of taken jobs has not exceeded a threshold, the number of untaken jobs is evaluated to determine if a threshold has been exceeded. If the threshold has been exceeded, auto-shutdown (e.g. by auto-shutdown module 520 in FIG. 5) occurs as indicated in 1390. If the number of untaken jobs has exceeded a given threshold, this may indicate that the workers (e.g., workers 530 in FIG. 5) are not able to handle the current load. If neither threshold has been exceeded, the queue size continues to be monitored, in some embodiments.

In some embodiments, the number of computation instances running to carry out the test plan are monitored. In some embodiments, monitoring the number of computation instances running to carry out the test plan is performed in parallel with monitoring the queue size as discussed above. As indicated in 1330, in some embodiments, the number of controllers and workers (e.g., controllers 560 and workers 530) are determined. As discussed above, in some embodiments, the controllers place jobs in the job queue at the rate determined by the test plan. As discussed above, in some embodiments, the workers access jobs from the job queue and post them to the production service under test (e.g., production service 100 in FIG. 5). If the number of controllers and/or workers exceed a threshold, as indicated in 1340, auto-shutdown 1390 occurs, in some embodiments. If neither have exceeded a threshold, the number of controllers and/or workers (e.g., controllers 560 and workers 530 in FIG. 5) continues to be monitored, in some embodiments.

As indicated in 1350, in some embodiments, the number of workers that are shutting themselves down or being shut down is monitored. Monitoring the number of workers shut down may be performed in addition to monitoring the queue size and/or number of computation instances as described above. In some embodiments, as indicated in 1360, if the number of workers that are shutting themselves down exceeds a threshold, auto-shutdown 1390 occurs. If the threshold has not been exceeded, in some embodiments, then the number of workers (e.g., workers 530 in FIG. 5) that have been shutdown continues to be monitored.

In some embodiments, as indicated in 1370, load metrics for the production service are monitored. Monitoring the health of the production service as indicated at 1370 may be performed in parallel to monitoring the queue size, computation instances, and/or number of workers auto-shutdown. Examples of load metrics are memory, CPU, disk and/or network usage of the production service under test (e.g. production service 100 in FIG. 1). For example, if the CPU using exceeds 90% on at least half of the compute resources in use for more than 30 minute, auto-shutdown may occur. In some embodiments, if any one of the load metrics indicates that the load on the production service is above a threshold, as indicated in 1380, shutdown 1390 occurs. If the load metrics are below a threshold, the load metrics continue to be monitored.

As discussed above, the queue size, number of computational instances, number of workers and/or load metrics are monitored in parallel in some embodiments. Any one of these or a combination of these may indicate a need to shutdown the scalable production test system, in some embodiments. Shutting down the scalable production test system may include, but is not limited to, deleting the queue, deleting the workers, deleting the controllers and/or any combination of these, in some embodiments.

Example Computer System

Figure 14:
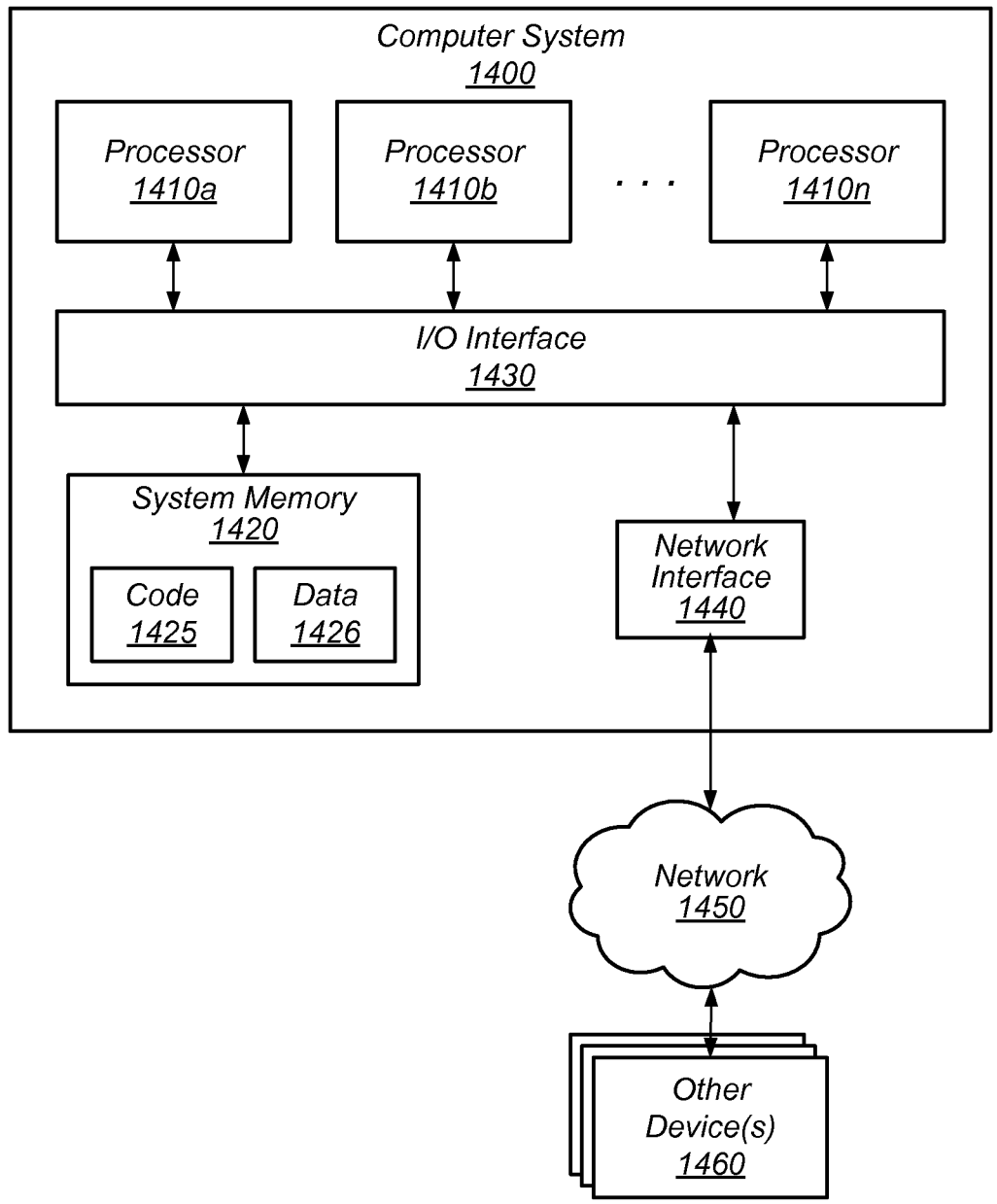
FIG. 14 illustrates a computer system for use in implementing a test system, according to one embodiment.

FIG. 14 is a diagram that illustrates a computer system for use in implementing a test system, according to one embodiment. Various portions of systems in FIGS. 1 and 5 and/or methods presented in FIGS. 2-4 and 6-13 and/or described herein, may be executed on one or more computer systems similar to that described herein, which may interact with various other devices of the system.

In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, audio device 1490, and display(s) 1480. In some embodiments, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

In some embodiments, at least one processor 1410 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1420 may be configured to store program instructions and/or data accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 1420 as program instructions 1425 and data storage 1435, respectively. In other embodiments, program instructions and/or data may be received, sent or stored upon different types of computer-accessible media or on similar media separate from system memory 1420 or computer system 1400. Generally speaking, a computer-accessible medium may include storage media or memory media such as magnetic or optical media, e.g., disk or CD/DVD-ROM coupled to computer system 1400 via I/O interface 1430. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1440. Program instructions may include instructions for implementing the techniques described with respect to any of the FIGs.

In some embodiments, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components. In addition, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems, or between nodes of computer system 1400. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, accelerometers, multi-touch screens, or any other devices suitable for entering or retrieving data by one or more computer system 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

Memory 1420 may include program instructions 1425, configured to implement embodiments of a layout-preserved text generation method as described herein, and data storage 1435, comprising various data accessible by program instructions 1425. In one embodiment, program instructions 1425 may include software elements of a method illustrated in the above Figures. Data storage 1435 may include data that may be used in embodiments described herein. In other embodiments, other or different software elements and/or data may be included.

Those skilled in the art will appreciate that computer system 1400 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
   a network-based production service implemented by one or more computers, wherein the production service is configured to:
      process requests from clients for the production service via a network; and a test system implemented by one or more computers configured to implement:
  one or more controllers configured to create test jobs according to a test plan for testing a production service, wherein the test plan specifies test data to simulate a load on the production service, and wherein each test job specifies a portion of the test data; and
  a load generator configured to implement:
    one or more workers configured to access the test jobs and provide test request data to the production service as specified by the test jobs,
  wherein the test system is configured to scale a number of the one or more controllers in response to one or more metrics of the production service or to scale a number of the one or more workers in response to the one or more metrics.

2. The system as recited in claim 1, wherein the test system is configured to scale the number of the one or more workers and to scale the number of the one or more controllers, wherein the number of the one or more controllers is scalable independently from the number of the one or more workers.

3. The system as recited in claim 1, wherein the test system is configured to scale the number of the one or more workers and to scale the number of the one or more controllers, wherein the number of the one or more workers is scalable independently from the number of the one or more controllers.

4. The system as recited in claim 1, wherein the test system is configured to scale the number of the one or more workers, wherein to scale the number of the one or more workers, an auto-scaler of the load generator is configured to add one or more additional workers to the one or more workers or to remove at least one worker from the one or more workers.

5. The system as recited in claim 1, wherein the test system is configured to scale the number of the one or more controllers, wherein to scale the number of the one or more controllers:
  at least one test plan builder implemented by at least one controller of the one or more controllers is configured to indicate a need to scale the number of the one or more controllers; and
  in response to the indicated need to scale the number of the one or more controllers, the test system is configured to implement one or more additional controllers to create test jobs according to the test plan or to stop at least one controller of the one or more controllers from creating test jobs according to the test plan.

6. The system as recited in claim 1, further comprising a job interface configured to receive and store test jobs from the one or more controllers according to the test plan, wherein accessing the test jobs comprises accessing the test jobs from the job interface.

7. A test system, comprising:
one or more computers configured to implement:
  one or more controllers configured to create test jobs according to a test plan for testing a production service, wherein the test plan specifies test data to simulate a load on the production service, and wherein each test job specifies a portion of test data; and
  one or more workers configured to access the test jobs and provide test request data to the production service as specified by the test jobs,
  wherein the one or more computers are configured to scale a number of the one or more controllers in response to one or more metrics of the production service or to scale a number of the one or more workers in response to the one or more metrics.

8. The test system as recited in claim 7, wherein the one or more computers are further configured to implement a job queue configured to receive and queue test jobs from the one or more controllers according to the test plan, wherein accessing the test jobs comprises accessing the test jobs from the job queue.

9. The test system as recited in claim 8, wherein the one or more computers are further configured to implement an auto-scaler, wherein the one or more computers are configured to scale the number of the one or more workers using the auto-scaler, and wherein the one or more metrics comprise a job quantity metric that indicates a number of test jobs in the job queue or comprise one or more health metrics that indicate a resource usage of the one or more workers.

10. The test system as recited in claim 9, wherein the auto-scaler is configured to implement additional workers in response to the job quantity metric indicating that the number of test jobs in the job queue exceeds a given job quantity threshold.

11. The test system as recited in claim 10, wherein the auto-scaler is configured to implement additional workers in response to at least one of the one or more health metrics indicating a memory usage, a CPU usage, a disk usage, or a network usage of the one or more workers being below a given health threshold.

12. The test system as recited in claim 11, wherein the given job quantity threshold, the given health threshold, or both are user-configurable.

13. The test system as recited in claim 9, wherein the auto-scaler is configured to reduce the number of the one or more workers in response to:
  the health metric indicating a memory usage, a CPU usage, a disk usage, or a network usage of the one or more workers being above a given health threshold; and
  the job quantity metric indicating a number of test jobs in the job queue being below a given job quantity threshold.

14. A method, comprising:
creating, by one or more controllers implemented on one or more computers, test jobs according to a test plan for testing a production service, wherein the test plan specifies test request data to simulate a load on the production service, and wherein each job specifies a portion of production request data;
accessing, by one or more workers implemented on one or more computers, the test jobs and providing test request data to the production service as specified by the test jobs; and
scaling, by the one or more computers, a number of the one or more controllers in response to one or more metrics of the production service or scaling a number of the one or more workers in response to the one or more metrics.

15. The method as recited in claim 14, further comprising, prior to scaling the number of the one or more workers, generating one or more predictive metrics based on the test plan, wherein the one or more metrics comprise the one or more predictive metrics, wherein scaling the number of the one or more workers comprises looking ahead according to the test plan and scheduling an increase or a decrease in the number of the one or more workers based on a predicted change in an amount of the test jobs according to the test plan.

16. The method as recited in claim 14, further comprising determining one or more status metrics that indicate a current state, wherein scaling the number of the one or more workers comprises reactively scaling the number of the one or more workers based on the one or more status metrics measuring current system state.

17. The method as recited in claim 14, further comprising scaling the number of the one or more workers independently from the number of the one or more controllers.

18. The method as recited in claim 14, further comprising scaling the number of the one or more controllers independently from the number of the one or more workers, wherein the one or more metrics comprise a size of the load to be simulated on the production service.

19. The method as recited in claim 14, further comprising, in response to receiving an indication that a particular worker of the one or more workers has failed to complete a particular number of test jobs or has a failure rate of executing the test jobs that exceeds a failure threshold, shutting down the particular worker.

20. The method as recited in claim 19, further comprising automatically shutting down the load on the production service in response to one or more of the following:
- a number of test jobs untaken by the one or more workers exceeding a given job threshold;
- the number of the one or more workers exceeding a given worker threshold;
- shutting down at least a number of the one or more workers or at least a percentage of the one or more workers; and
- one or more load metrics of the production service exceeding a given load metric threshold.

* * * * *